(12) United States Patent
Iwadate

(10) Patent No.: US 8,582,135 B2
(45) Date of Patent: Nov. 12, 2013

(54) IMAGE FORMING APPARATUS, CONTROL METHOD THEREFOR, AND COMPUTER-READABLE STORAGE MEDIUM

(75) Inventor: Masahiro Iwadate, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 705 days.

(21) Appl. No.: 12/358,136

(22) Filed: Jan. 22, 2009

(65) Prior Publication Data

US 2009/0190156 A1  Jul. 30, 2009

(30) Foreign Application Priority Data

Jan. 25, 2008  (JP) .................................. 2008-014461

(51) Int. Cl.
*G06F 15/00* (2006.01)
*G06K 15/02* (2006.01)

(52) U.S. Cl.
USPC ........ 358/1.14; 358/1.13; 358/1.15; 358/1.16

(58) Field of Classification Search
USPC .......... 358/1.1–1.4, 1.6, 1.11–1.17; 399/8, 19
See application file for complete search history.

(56) References Cited

U.S. PATENT DOCUMENTS

| | | | | | |
|---|---|---|---|---|---|
| 5,970,223 | A | * | 10/1999 | Debes et al. | 358/1.16 |
| 7,016,061 | B1 | * | 3/2006 | Hewitt | 358/1.15 |
| 2003/0007179 | A1 | * | 1/2003 | Ferlitsch | 358/1.16 |
| 2004/0130701 | A1 | * | 7/2004 | Omura | 355/133 |
| 2004/0190012 | A1 | * | 9/2004 | Yamada | 358/1.2 |
| 2006/0232812 | A1 | * | 10/2006 | Shimizu | 358/1.14 |
| 2008/0030779 | A1 | * | 2/2008 | Asai | 358/1.15 |

FOREIGN PATENT DOCUMENTS

| | | | |
|---|---|---|---|
| JP | 07-096638 | A | 4/1995 |
| JP | 08-039898 | A | 2/1996 |
| JP | 2803087 | B2 | 9/1998 |

* cited by examiner

*Primary Examiner* — Allen H Nguyen
(74) *Attorney, Agent, or Firm* — Canon U.S.A., Inc., IP Division

(57) ABSTRACT

An image forming apparatus is provided that includes a storage unit configured to store print data which is received from a host, a generation unit configured to read the print data which is stored in the storage unit and generate an intermediate code, and an image forming unit configured to form an image according to the intermediate code which is generated by the generation unit. The image forming apparatus also has a restriction unit that is configured not to restrict execution of a specific print function if a processing unit configured to process the print data by interactively communicating with the host is not installed in the image forming apparatus, and is configured to restrict execution of the specific print function if the processing unit configured to process the print data by interactively communicating with the host is installed in the image forming apparatus.

12 Claims, 24 Drawing Sheets

| JobID | |
|---|---|
| JOB SETTING INFORMATION | JOB EXECUTION MODE (NORMAL/INTERRUPTION/ RESERVATION) |
| | PDL TYPE (LIPS/PostScript) |
| | NUMBER OF SETS OF COPIES |
| | COLLATE PRINTING (OFF/ON) |
| JOB CONTROL INFORMATION | STATUS (WAITING FOR EXECUTION/ JOB IN EXECUTION/INTERRUPTION REQUEST/WAITING FOR SUSPENSION/ JOB UNDER SUSPENSION) |
| | READING MODE (READ AND DELETE/BACKUP) |
| | TOTAL NUMBER OF PAGES (TP) |
| | NUMBER OF GENERATED PAGES (RP) |
| | NUMBER OF PRINTED PAGES (OP) |

| | JobID |
|---|---|
| JOB SETTING INFORMATION | JOB EXECUTION MODE (NORMAL/INTERRUPTION/ RESERVATION) |
| | PDL TYPE (LIPS/PostScript) |
| | NUMBER OF SETS OF COPIES |
| | COLLATE PRINTING (OFF/ON) |
| | PAP Direct (False/True) |
| JOB CONTROL INFORMATION | STATUS (WAITING FOR EXECUTION/ JOB IN EXECUTION/INTERRUPTION REQUEST/WAITING FOR SUSPENSION/ JOB UNDER SUSPENSION) |
| | READING MODE (READ AND DELETE/BACKUP) |
| | TOTAL NUMBER OF PAGES (TP) |
| | NUMBER OF GENERATED PAGES (RP) |
| | NUMBER OF PRINTED PAGES (OP) |

IMAGE FORMING APPARATUS, CONTROL METHOD THEREFOR, AND COMPUTER-READABLE STORAGE MEDIUM

BACKGROUND OF THE INVENTION

1. Field of the Invention

The present invention generally relates to an image forming apparatus, a control method therefor, and a computer-readable storage medium containing computer-executable instructions for implementing various functions based on print data (page description language (PDL) data) of a print job received from a host.

2. Description of the Related Art

A conventional image forming and output apparatus, which forms an image of print data (PDL data) of a print job received from a host and outputs the formed image, stores the print data (PDL data) of the received print job. Thus, the conventional image forming and output apparatus implements various functions.

Japanese Patent Application Laid-Open No. 07-096638 discusses such an apparatus capable of performing interruption printing by interrupting a currently executed print job.

Further, Japanese Patent No. 02803087 discusses an apparatus capable of performing collate printing for bringing together print products with respect to each job.

Furthermore, Japanese Patent Application Laid-Open No. 08-039898 discusses an apparatus capable of performing reservation printing for reserving a print job (i.e., not starting printing of the print job), until a user enters a correct password.

Meanwhile, a specific type of PDL exists that supports an interactive print mode. The "interactive print mode" refers to a print mode for interactively performing print processing between a host and a printer.

For example, PostScript® of Adobe® Systems Incorporated supports an interactive data communication in which a printer sends to a host a result of executing PostScript data (e.g., a command) that has been transmitted from the host.

FIG. 2 illustrates the above-described case, where the printer sends a response ("true" (=installed)) to an inquiry (e.g., command) about whether Times-Roman font is installed, which inquiry has been transmitted from the host.

However, the following may arise in a case where the above-described conventional image forming apparatus simultaneously executes a function implemented by received print data that it stores (such as an interruption printing function, a collate printing function, or a reservation printing function), and a print mode for interactively performing printing with the host.

FIG. 3 illustrates print data (PDL data).

Referring to FIG. 3, PDL data 301 is constituted by commands 1 through 4. When the command 1 is executed, response data 1, which is a response to the host, is generated. Similarly, when the command 3 is executed, response data 2 is generated.

In addition, page 1 is generated when the commands 1 and 2 are executed. In the same way, when the commands 3 and 4 are executed, page 2 is generated.

The printer (FIG. 2) stores the PDL data 301 received from the host, so that the interruption printing, the collate printing, and the reservation printing are implemented.

FIG. 4 illustrates an example of processing when the printer receives an interrupting job while processing the PDL data 301.

In the example illustrated in FIG. 4, the processing performed by a PDL interpreter in the printer is suspended when the interrupting job is input. Accordingly, in this case, response data to a command, which is not executed, is not sent to the host. Therefore, the host may continue waiting for response data from the printer.

Further, in resuming the interrupted job (e.g., returning from the interrupting job) after the processing for the interrupting job has been completed, the PDL interpreter interprets the PDL data 301 stored in the printer all over again from its top portion.

This is because the PDL interpreter cannot resume interpreting the PDL data 301, whose interpretation has been suspended, from the suspended portion, since a content of the PDL data (e.g., PostScript) 301 may have been recursively described.

When the PDL interpreter interprets the PDL data 301 again from its top portion, the response data 1 is generated upon executing the command 1. Then, the PDL interpreter sends the generated response data 1 to the host again.

However, at this time, the host has been waiting for the response data 2 corresponding to the command 3 that is different from the response data 1 sent from the PDL interpreter, so that inconsistency can arise.

On the other hand, a number of pages so far printed can also be easily stored when the interrupting job is input and the job is suspended. Consequently, an image of the already printed pages can be excluded from printing when returning from the interrupting job.

However, the number of printed pages and a state of the executed command before executing the interrupting job do not always correspond to each other because the content of the PDL data 301 has been recursively described, as discussed above. Accordingly, it may be difficult not to send the response data to the host.

This may arise in each of the cases where an interrupting job is input while an interactive print job is processed and where the PDL interpreter returns from processing of the interrupting job.

FIG. 5 illustrates an example of processing performed by the printer for printing two or more sets of copies of the PDL data 301 by collate printing.

In FIG. 5, the PDL interpreter interprets the PDL data 301 stored in the printer again from its top portion in printing the second and subsequent sets of copies. Therefore, the PDL interpreter sends the response data 1 and 2 when the PDL interpreter performs the interpretation for a plurality of times.

However, since the host has sent the PDL data 301 only once, an inconsistency occurs between the PDL data 301 and the response data 1 and 2 sent for the plurality of times. As described above, this may arise in the case of printing two or more sets of copies of the interactive print job by collate printing.

Meanwhile, in a case of reservation printing, the PDL interpreter does not start interpreting the PDL data stored in the printer unless a user issues a print start instruction. Accordingly, in this case, the PDL interpreter does not send any response data to the host until the user issues the print start instruction even in the case of the interactive print job. Therefore, the host may continue waiting for the response data from the printer.

SUMMARY OF THE INVENTION

According to an aspect of the present invention, an image forming apparatus is provided that includes a storage unit configured to store print data which is received from a host, a generation unit configured to read the print data which is stored on the storage unit and generate an intermediate code, and an image forming unit configured to form an image according to the intermediate code which is generated by the generation unit. The image forming apparatus also includes a restriction unit configured not to restrict execution of a specific print function if a processing unit configured to process the print data by interactively communicating with the host is not installed in the image forming apparatus, and configured to restrict execution of the specific print function if the processing unit configured to process the print data by interactively communicating with the host is installed in the image forming apparatus.

According to another aspect of the present invention, an image forming apparatus is provided that includes a storage unit configured to store print data which is received from a host, a generation unit configured to read the print data which is stored on the storage unit and generate an intermediate code, and an image forming unit configured to form an image according to the intermediate code which is generated by the generation unit. The image forming apparatus also includes a restriction unit configured not to restrict execution of a specific print function if the received data is not print data processed by interactively communicating with the host, and configured to restrict execution of the specific print function if the received data is print data processed by interactively communicating with the host.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe principles of the present invention.

FIG. 15 illustrates an exemplary configuration of a job management table according to the first exemplary embodiment of the present invention.

FIG. 23 illustrates an exemplary configuration of a job management table according to a second exemplary embodiment of the present invention.

DETAILED DESCRIPTION OF THE EMBODIMENTS

Various exemplary embodiments, features, and aspects of the present invention will now be herein described in detail below with reference to the drawings. It is noted that the relative arrangement of the components, the numerical expressions, and the numerical values set forth in these embodiments are not intended to limit the scope of the present invention.

Figure 6:
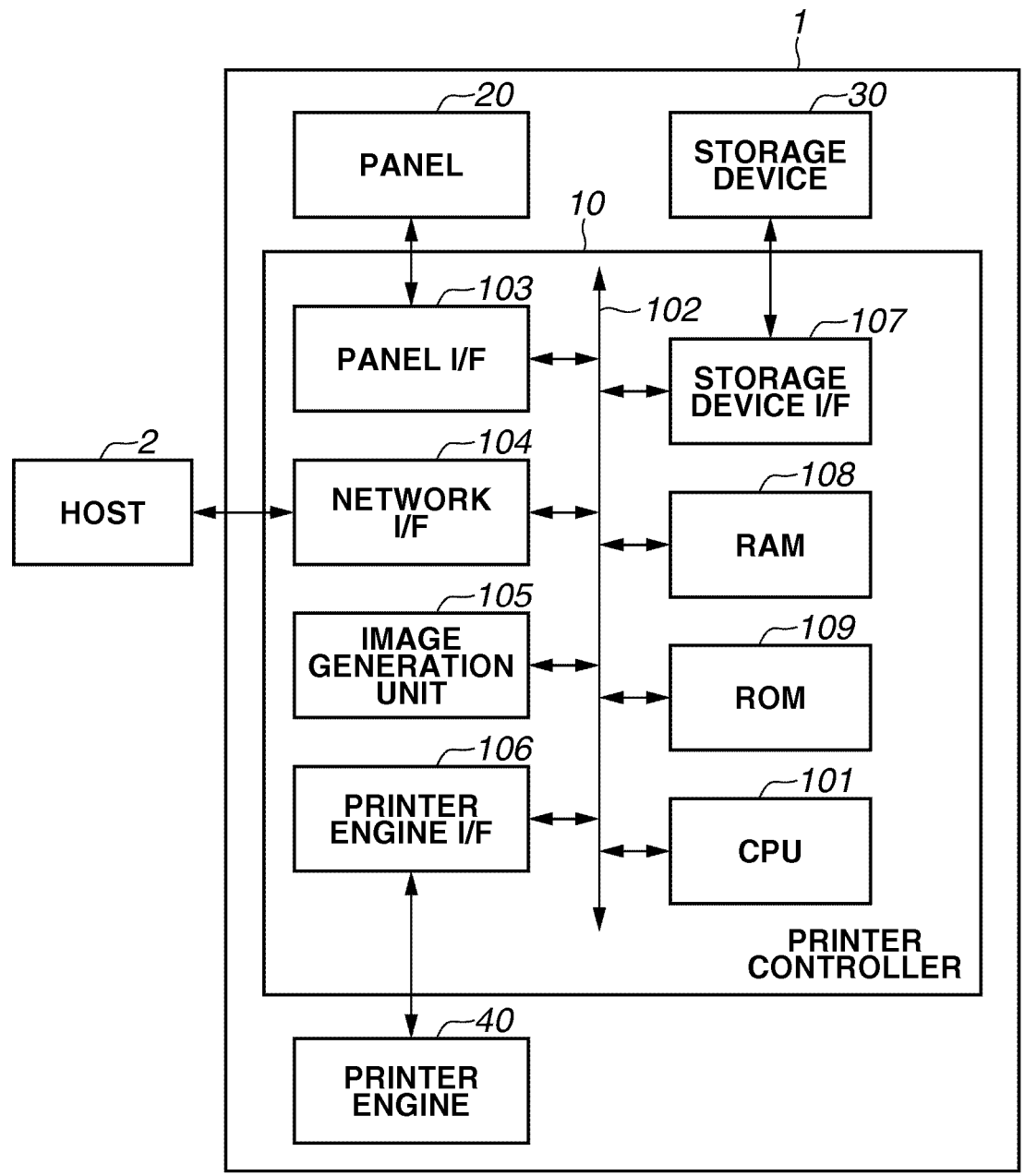
FIG. 6 illustrates an exemplary hardware configuration of an image forming apparatus according to an exemplary embodiment of the present invention.

FIG. 6 illustrates an exemplary hardware configuration of an image forming apparatus according to an exemplary embodiment of the present invention.

Referring to FIG. 6, the embodiment of the image forming apparatus 1 illustrated therein includes a printer controller (hereinafter also referred to as a "controller") 10. The printer controller 10 may control operations of the entire image forming apparatus 1. Further, the image forming apparatus 1 includes a panel 20, a storage device (e.g., a hard disk drive (HDD)) 30, and a printer engine 40. The panel 20 may receive an instruction issued by a user and display thereon the received user instruction. The storage device 30 may store print data of a print job received from a host 2. The printer engine 40 may perform printing.

An embodiment of the controller 10 will be described below. In this embodiment, a panel interface (I/F) 103, a network I/F 104, an image generation unit 105, a printer engine I/F (printer I/F) 106, a storage device I/F 107, a random access memory (RAM) 108, and a read-only memory (ROM) 109, are in communication with one another via a central processing unit (CPU) bus 102 of a CPU 101.

The panel I/F 103 is connected to the panel 20. The panel I/F 103 notifies of a user instruction input via the panel 20 to the CPU 101. Furthermore, on the panel 20, the panel I/F 103 displays screen information and setting information stored in the ROM 109 and the RAM 108.

The network I/F 104 transmits and receives data to and from the host 2 which is connected on the network. The image generation unit 105 generates a bitmap image based on a display list generated by interpreting the data received from the host 2.

The printer I/F 106 outputs the bitmap image generated by the image generation unit 105 to the printer engine 40 according to an instruction from the CPU 101.

The storage device I/F 107 transmits and receives data to and from the storage device 30. The RAM 108 is a memory used as a work area of the CPU 101.

The ROM 109 is a memory that stores a control program and the screen information to be displayed on the panel 20. The CPU 101 controls each component of the controller 10 according to the control program stored in the ROM 109.

Figure 1:
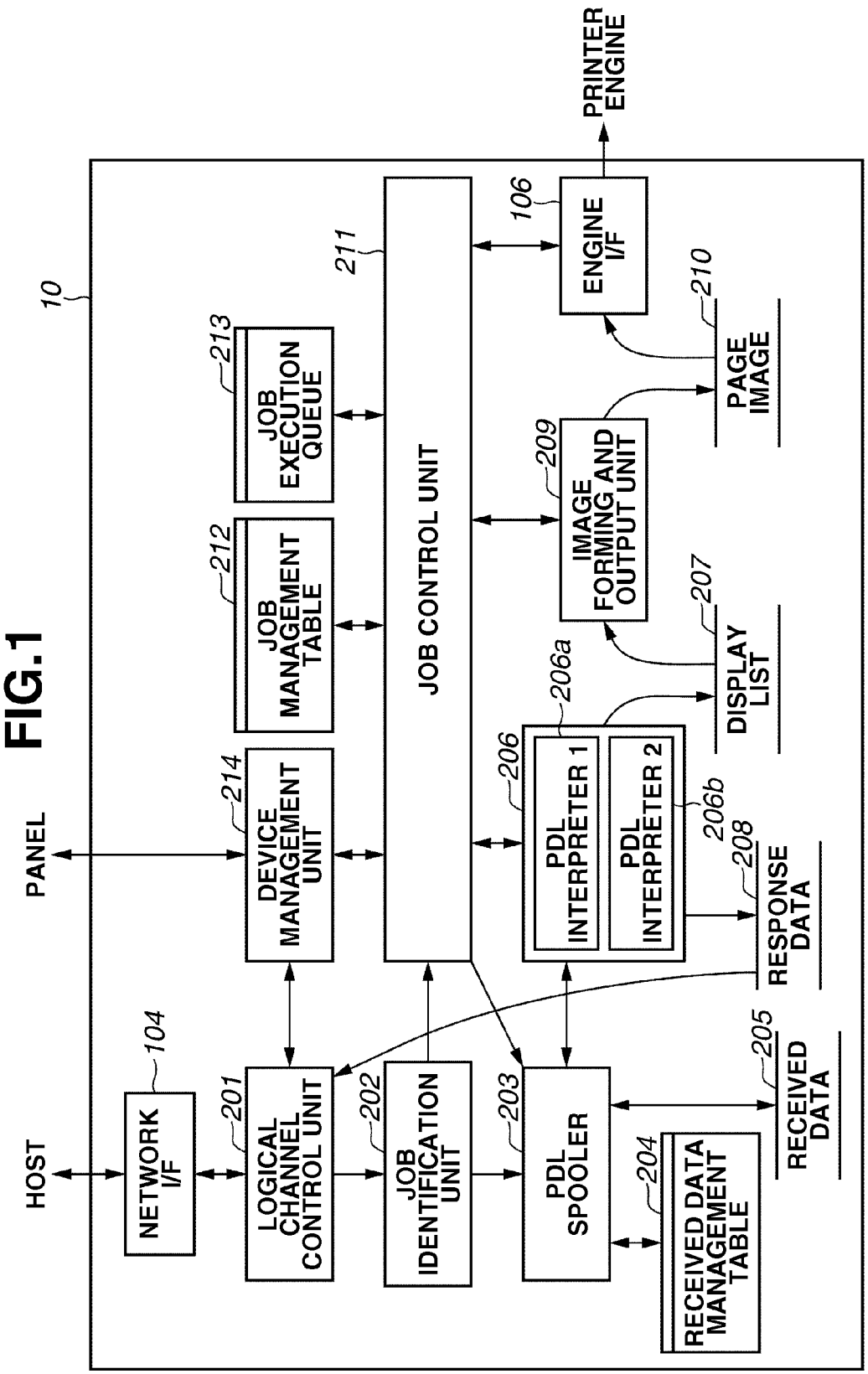
FIG. 1 illustrates exemplary functional blocks of a controller according to an exemplary embodiment of the present invention.
Figure 2:
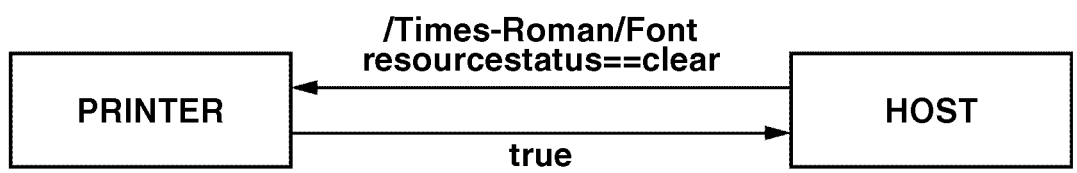
FIG. 2 illustrates an example of processing performed when a printer sends a response to an inquiry from a host.
Figure 3:
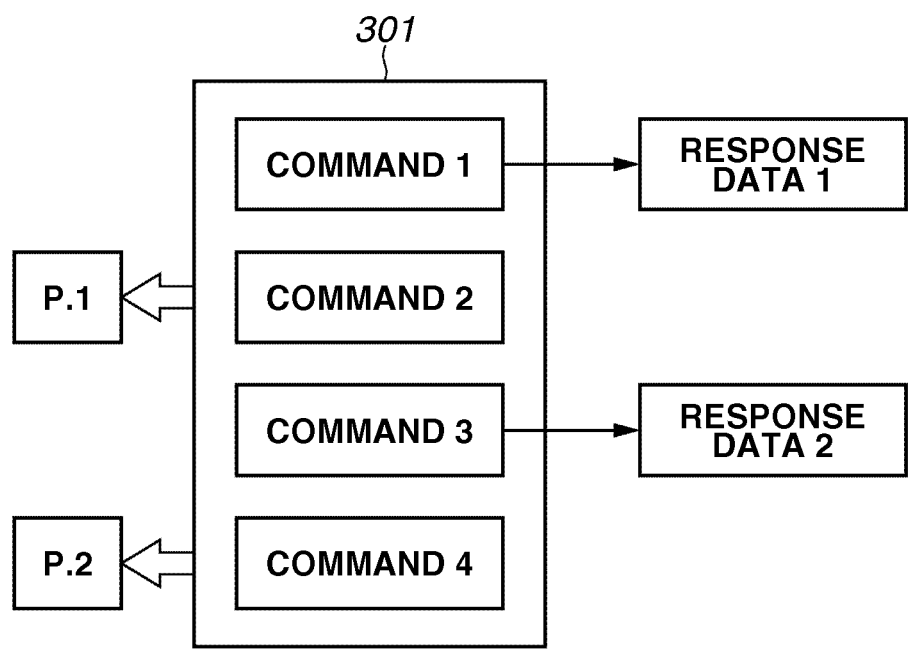
FIG. 3 illustrates an example of PDL data that generates response data to be transmitted to a host.
Figure 4:
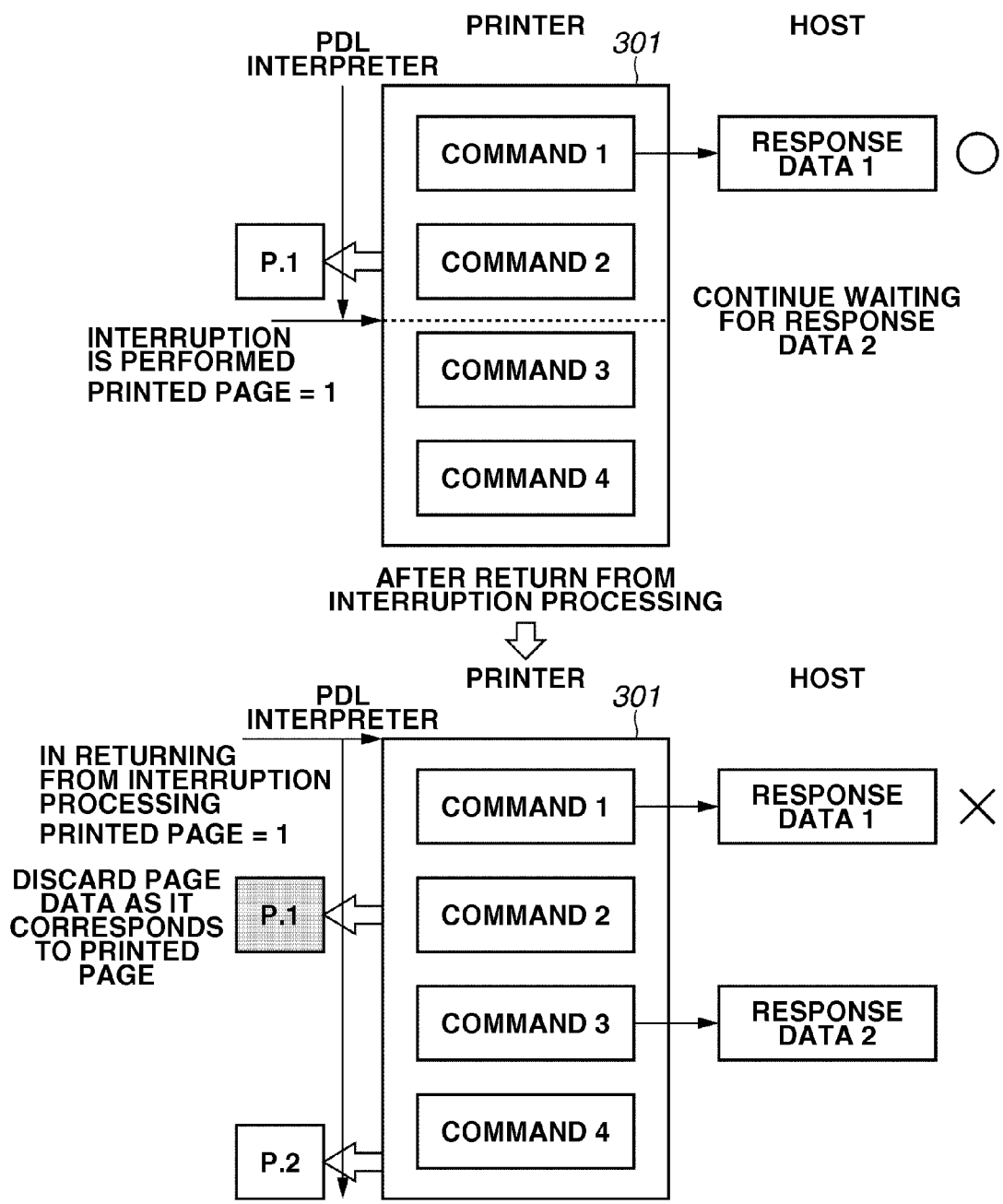
FIG. 4 illustrates an example of processing performed when a printer receives an interrupting job while processing PDL data.
Figure 5:
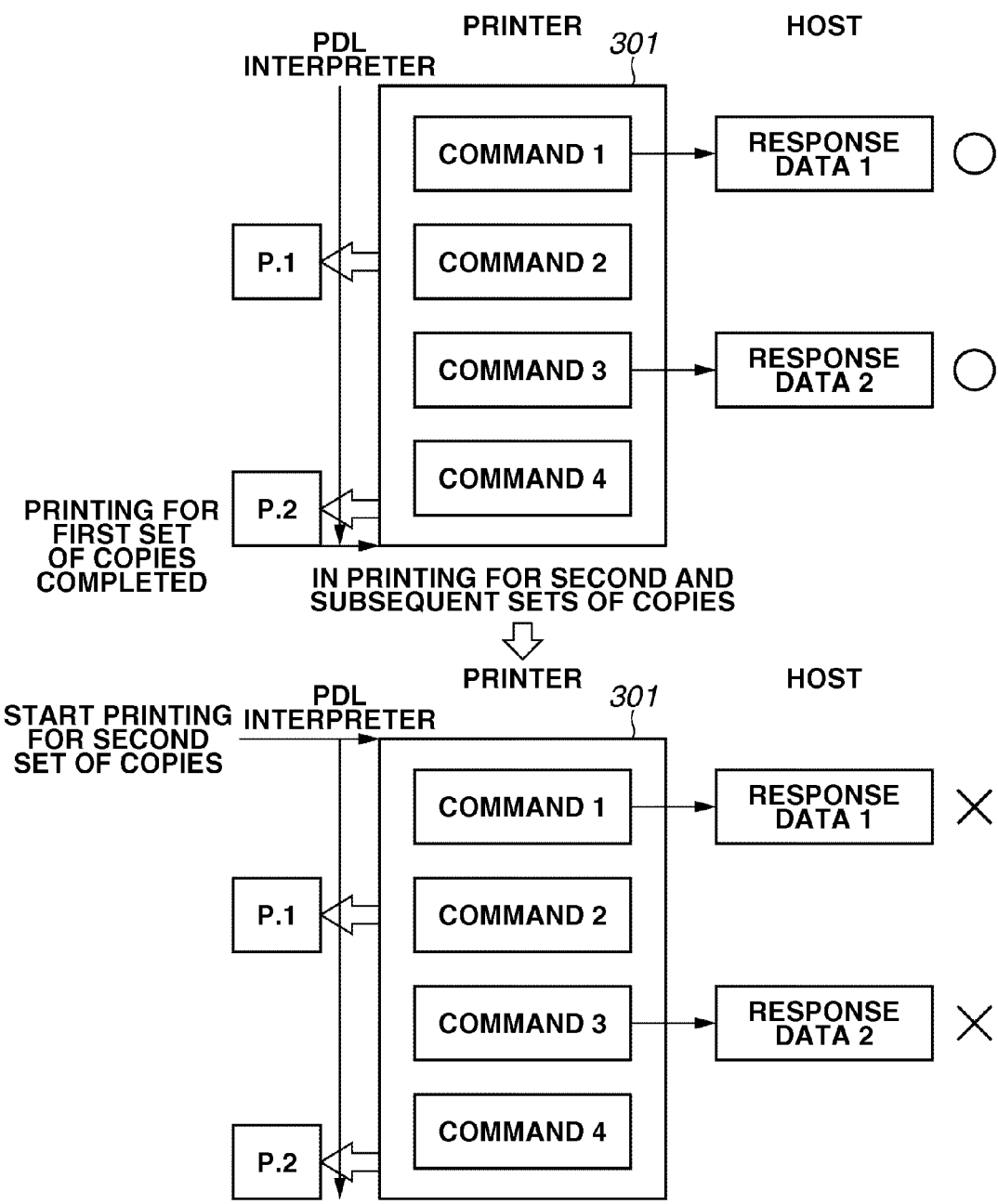
FIG. 5 illustrates an example of processing performed by a printer for printing two or more sets of copies of PDL data by collate printing.

FIG. 1 illustrates exemplary functional blocks of the controller 10 according to the present exemplary embodiment.

Referring to the embodiment illustrated in FIG. 1, a logical channel control unit 201 allocates a job packet and a management packet of the print job received by the network I/F 104 to different channels. Thus, the logical channel control unit 201 multiplexes a transport layer of seven layers of the Open Systems Interconnection (OSI).

Further, the logical channel control unit 201 transmits response data 208, which is generated by a PDL interpreter 206, to the host 2 via the network I/F 104.

A job identification unit 202 analyzes the received job packet. Then, the job identification unit 202 transfers job setting information included in the received job packet to a job control unit 211. Further, the job identification unit 202 transfers print data (e.g., PDL data 205) included in the received job packet to a PDL spooler 203.

The PDL spooler 203 transmits the received PDL data 205 to the PDL interpreter 206. In addition, the PDL spooler 203 stores the received PDL data 205 on the RAM 108 and the storage device 30.

A received data management table 204 is used by the PDL spooler 203 for managing the received PDL data 205 with respect to each job.

The PDL interpreter 206 interprets the PDL data 205 read from the PDL spooler 203 to generate a display list (e.g., intermediate code) 207 and stores the generated intermediate code 207 on the RAM 108.

Moreover, in a case where the response data 208 to be sent to the host is generated as a result of interpreting the received PDL data 205, the PDL interpreter 206 stores the generated response data 208 to be sent to the host, on the RAM 108.

Furthermore, the PDL interpreter 206 sends a response data storage notification to the logical channel control unit 201.

A plurality of PDL interpreters 206 (e.g., PDL interpreters 206a and 206b in FIG. 1) can be used in the present exemplary embodiment. In this case, the PDL interpreter corresponding to each type of the received PDL data 205 performs the processing.

An image forming and output unit 209 rasterizes the display list (e.g., the intermediate code) 207 into a page image 210 with the image generation unit 105 and outputs the rasterized page image 210 to the printer engine 40 via the printer I/F 106. The printer engine 40 may perform printing on a paper sheet based on the page image 210.

A device management unit 214 notifies an operation instruction input via the panel 20 and an operation instruction input from the host 2 as the management packet to the job control unit 211. Further, the device management unit 214 displays a device status on the panel 20.

The job control unit 211 is connected to the job identification unit 202, the PDL spooler 203, the PDL interpreter 206, the image forming and output unit 209, and the device management unit 214. Thus, the job control unit 211 can perform data communication with the above-described functional units to execute the print job.

The job management table 212 is a table used by the job control unit 211 to manage a job. The job setting information input from the job identification unit 202 and job control information are stored in the job management table 212 with respect to each job.

A job execution queue 213 is a table used by the job control unit 211 to control an order of executing the job. Pointers to the job management table 212 are stored in the job execution queue 213 in the order of execution.

Now, an example of processing performed by the functional units (e.g., the job identification unit 202, the PDL spooler 203, the PDL interpreter 206, and the job control unit 211) of the controller 10 according to the exemplary embodiment of the present invention, will be described in detail below.

Figure 7:
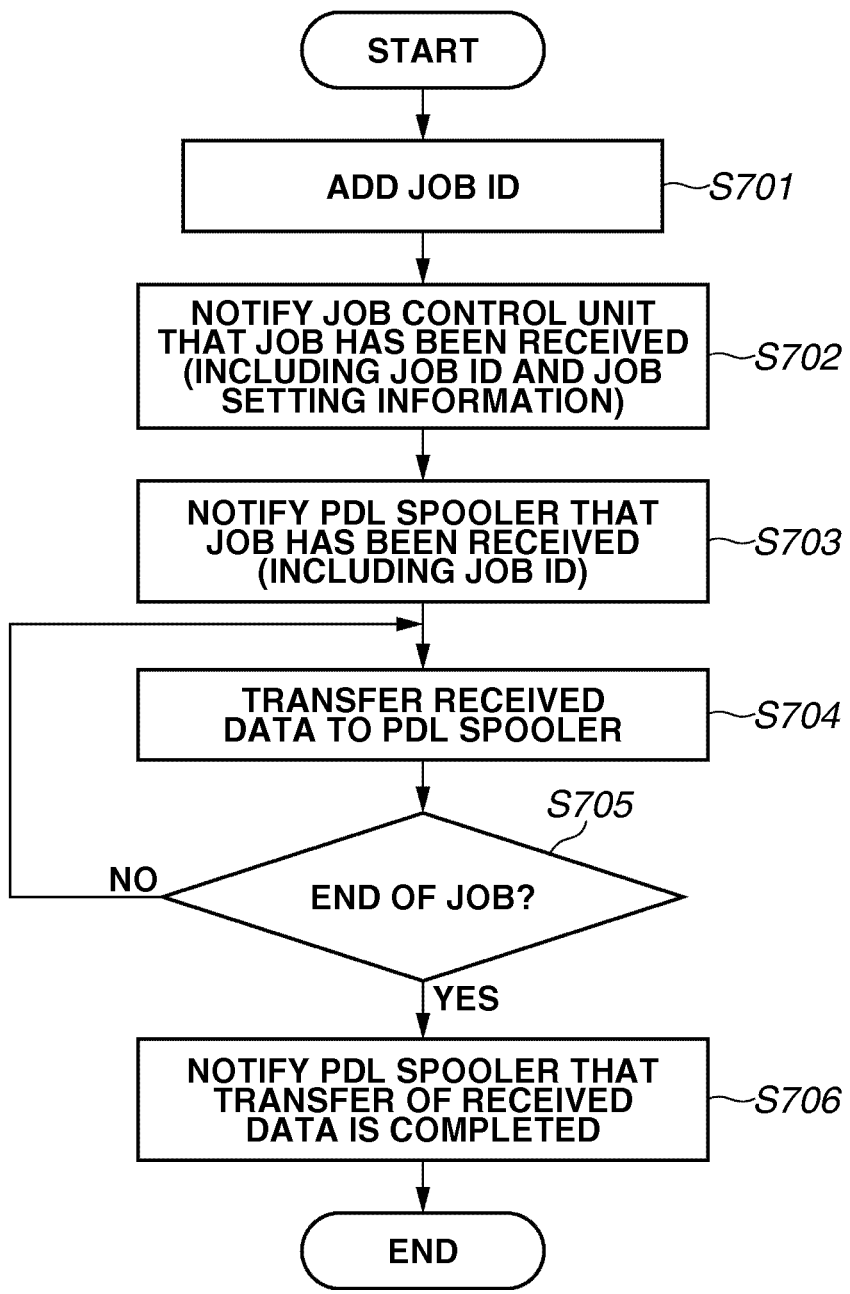
FIG. 7 is a flow chart illustrating an example of job receiving processing performed by a job identification unit according to an exemplary embodiment of the present invention.

FIG. 7 is a flow chart illustrating an example of a processing program executed by the job identification unit 202 when the job identification unit 202 has received a new job from the network I/F 104.

Referring to FIG. 7, in step S701, when a new job is received, the job identification unit 202 adds a job identification (e.g., job ID) to identify the received job.

In step S702, the job identification unit 202 sends the job ID and the job setting information which are added to and set for the new job, and notifies the job control unit 211 of reception of the job.

In step S703, the job identification unit 202 notifies the PDL spooler 203 of reception of the job. In step S704, the job identification unit 202 transfers a series of received data included in the received job to the PDL spooler 203.

In step S705, the job identification unit 202 detects an end of the job. More specifically, in step S705, the job identification unit 202 determines whether the job has been completely performed to the end thereof. If it is determined that the job has been completely performed to the end thereof (YES in step S705), then the processing advances to step S706. In step S706, the job identification unit 202 transmits a notification indicating that the received data has been completely transferred to the PDL spooler 203. Then, the processing ends.

On the other hand, if it is determined that the job has not been completely performed to the end thereof (NO in step S705), then the processing returns to step S704 and the processing is repeated.

Figure 8:
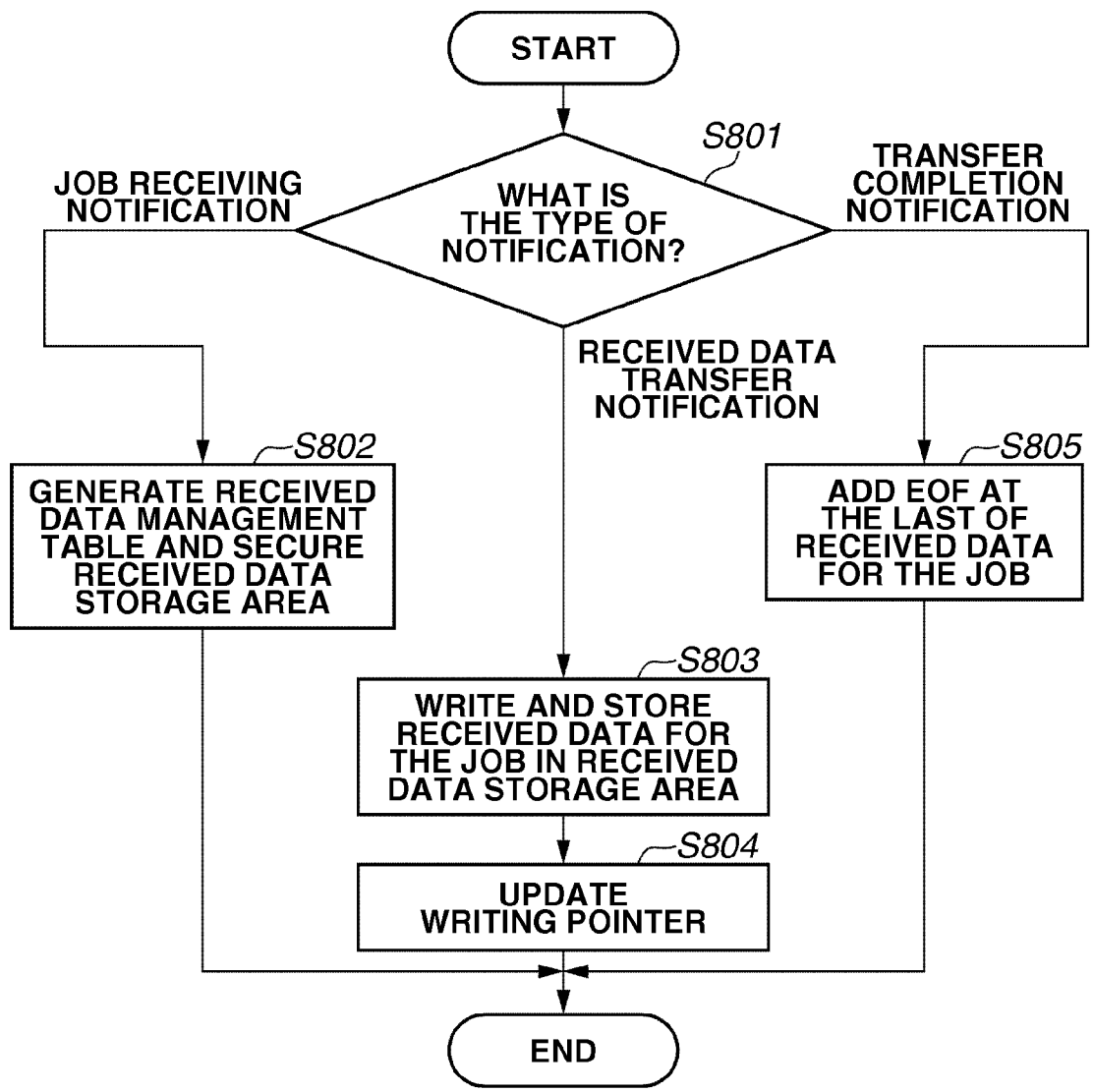
FIG. 8 is a flow chart illustrating an example of received data storage processing performed by a PDL spooler according to an exemplary embodiment of the present invention.

FIG. 8 is a flow chart illustrating an example of a processing program for storing the data received from the job identification unit 202 in the PDL spooler 203.

Referring to FIG. 8, in step S801, when the notification from the job identification unit 202 is received, the PDL spooler 203 determines a type of the notification.

If it is determined that the type of the notification is a job receiving notification (JOB RECEIVING NOTIFICATION in step S801), then the processing advances to step S802.

In step S802, the PDL spooler 203 newly generates a received data management table 204 and secures a storage area for the received data on the RAM 108 or the storage device 30.

Figure 9:
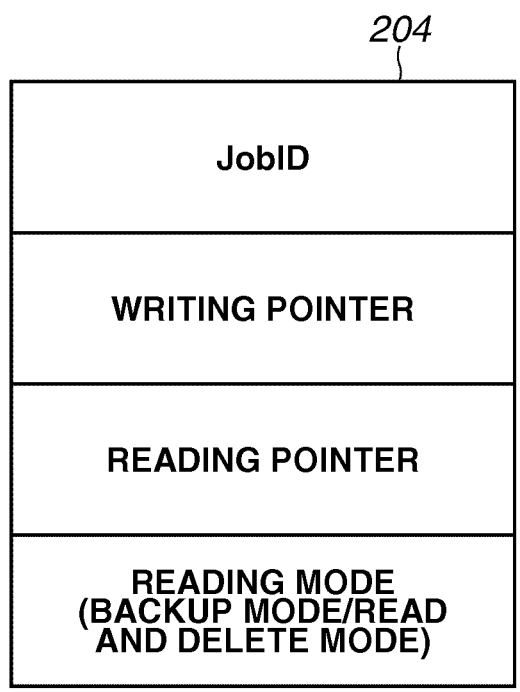
FIG. 9 illustrates an exemplary configuration of a received data management table according to an exemplary embodiment of the present invention.

FIG. 9 illustrates an exemplary configuration of the received data management table 204.

The embodiment of the received data management table 204 illustrated in FIG. 9 may be generated with respect to each job. The received data management table 204 may comprise the "JobID", a "writing pointer", a "reading pointer", and a "reading mode".

The "JobID" indicates a job identifier. The job ID notified from the job identification unit 202 is set to the "JobID".

The "writing pointer" indicates a storage destination of the received data 205. More specifically, an address of the received data storage destination secured by the PDL spooler 203 is set to the "writing pointer".

The "reading pointer" indicates a destination from which the received data 205 is read. A same address as the "writing pointer" is set to the "reading pointer" at the time the table is generated.

The "reading mode" indicates the processing performed after the received data 205 has been read. A "backup mode" indicates a mode for storing the received data 205 after the received data 205 has been read. A "read and delete mode" indicates a mode for deleting the received data 205 at the time the received data 205 has been read.

The "reading mode" is designated at the time of starting the reading from the PDL interpreter 206. Accordingly, the "reading mode" is not set at the time the table is generated.

Returning to the flow chart of FIG. 8, if it is determined in step S801 that the type of the notification is a received data transfer notification (RECEIVED DATA TRANSFER NOTIFICATION in step S801), then the processing advances to step S803. In step S803, the PDL spooler 203 writes the data received from the job identification unit 202 in the received data storage area for the job. In step S804, the PDL spooler 203 updates the "writing pointer".

If it is determined that the type of the notification is a received data transfer completion notification (TRANSFER COMPLETION NOTIFICATION in step S801), then the processing advances to step S805. In step S805, the PDL spooler 203 adds a description "EOF", which indicates the end of the data, to a last portion of the received data 205 of the job. Then, the series of processing ends.

Figure 10:
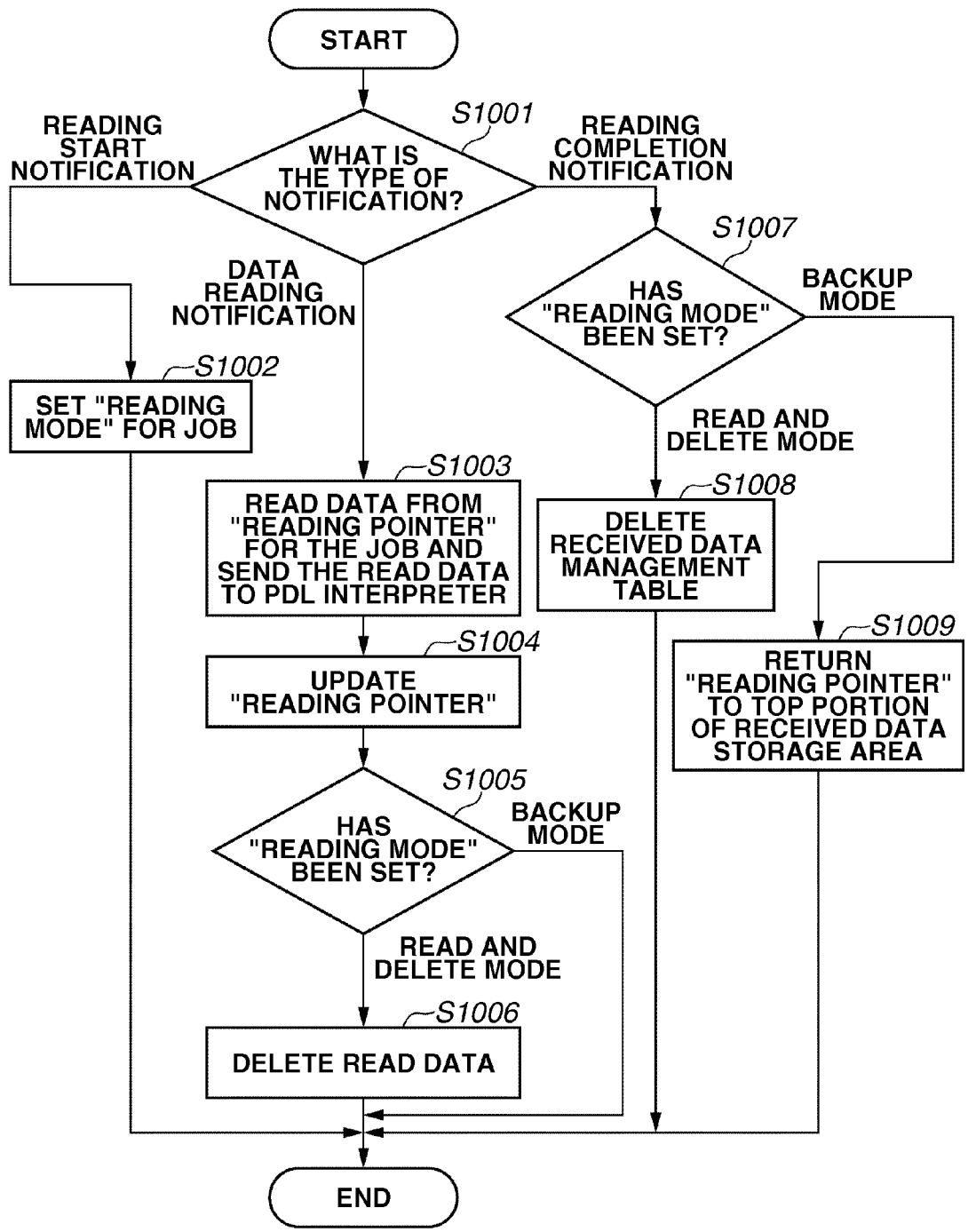
FIG. 10 is a flow chart illustrating an example of received data transfer processing performed by a PDL spooler according to an exemplary embodiment of the present invention.

FIG. 10 is a flow chart illustrating an example of a processing program executed by the PDL spooler 203 for transferring the received data 205 to the PDL interpreter 206.

Referring to the example illustrated in FIG. 10, in step S1001, when a notification from the PDL interpreter 206 is received, the PDL spooler 203 determines the type of the notification.

If it is determined that the type of the notification is a received data reading start notification (READING START NOTIFICATION in step S1001), then the processing advances to step S1002.

In step S1002, the PDL spooler 203 sets the "reading mode" designated by the PDL interpreter 206 in the received job management table 204.

If it is determined that the type of the notification is a received data reading notification (DATA READING NOTIFICATION in step S1001), then the processing advances to step S1003.

In step S1003, the PDL spooler 203 reads the received data 205 from the "reading pointer" of the job and transmits the read received data 205 to the PDL interpreter 206.

In step S1004, the PDL spooler 203 updates the "reading pointer" by a data size equivalent to the data that has been transmitted to the PDL interpreter 206.

In step S1005, the PDL spooler 203 determines whether the "read and delete mode" is set as the "reading mode".

If it is determined that the "read and delete mode" is set as the "reading mode" (READ AND DELETE MODE in step S1005), then the processing advances to step S1006. In step S1006, the PDL spooler 203 deletes the received data 205 that has been transmitted to the PDL interpreter 206 from the received data storage area at this time.

On the other hand, if it is determined that the "backup mode" is set as the "reading mode" (BACKUP MODE in step S1005), then the processing ends.

If it is determined in step S1001 that the type of the notification is a received data reading completion notification (READING COMPLETION NOTIFICATION in step S1001), then the processing advances to step S1007. In step S1007 different types of processing are performed according to a type of the "reading mode".

If it is determined in step S1007 that the "read and delete mode" is set as the "reading mode" (READ AND DELETE MODE in step S1007), then the processing advances to step S1008. In step S1008, the PDL spooler 203 deletes the received data management table 204 of the job at this timing.

On the other hand, if it is determined that the "backup mode" is set as the "reading mode" (BACKUP MODE in step S1007), then the processing advances to step S1009. In step S1009, the PDL spooler 203 returns the "reading pointer" of the job to a top portion of the received data storage area without deleting the received data management table 204.

Accordingly, when the PDL interpreter 206 reads the received data 205 again, the interpreting of the received data 205 can be started from its top portion.

Figure 11:
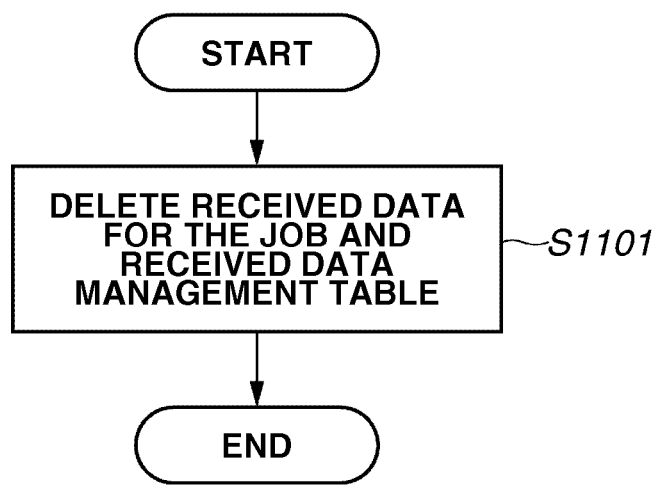
FIG. 11 is a flow chart illustrating an example of received data deleting processing performed by a PDL spooler according to an exemplary embodiment of the present invention.

FIG. 11 is a flow chart illustrating an example of a processing program executed by the PDL spooler 203 when a notification indicating that the received data 205 is designated to be deleted from the job control unit 211.

Referring to the example illustrated in FIG. 11, in step S1101, the PDL spooler 203 deletes the received data 205 of the job designated by the job control unit 211 from the received data storage area and also deletes the received job management table 204.

Figure 12:
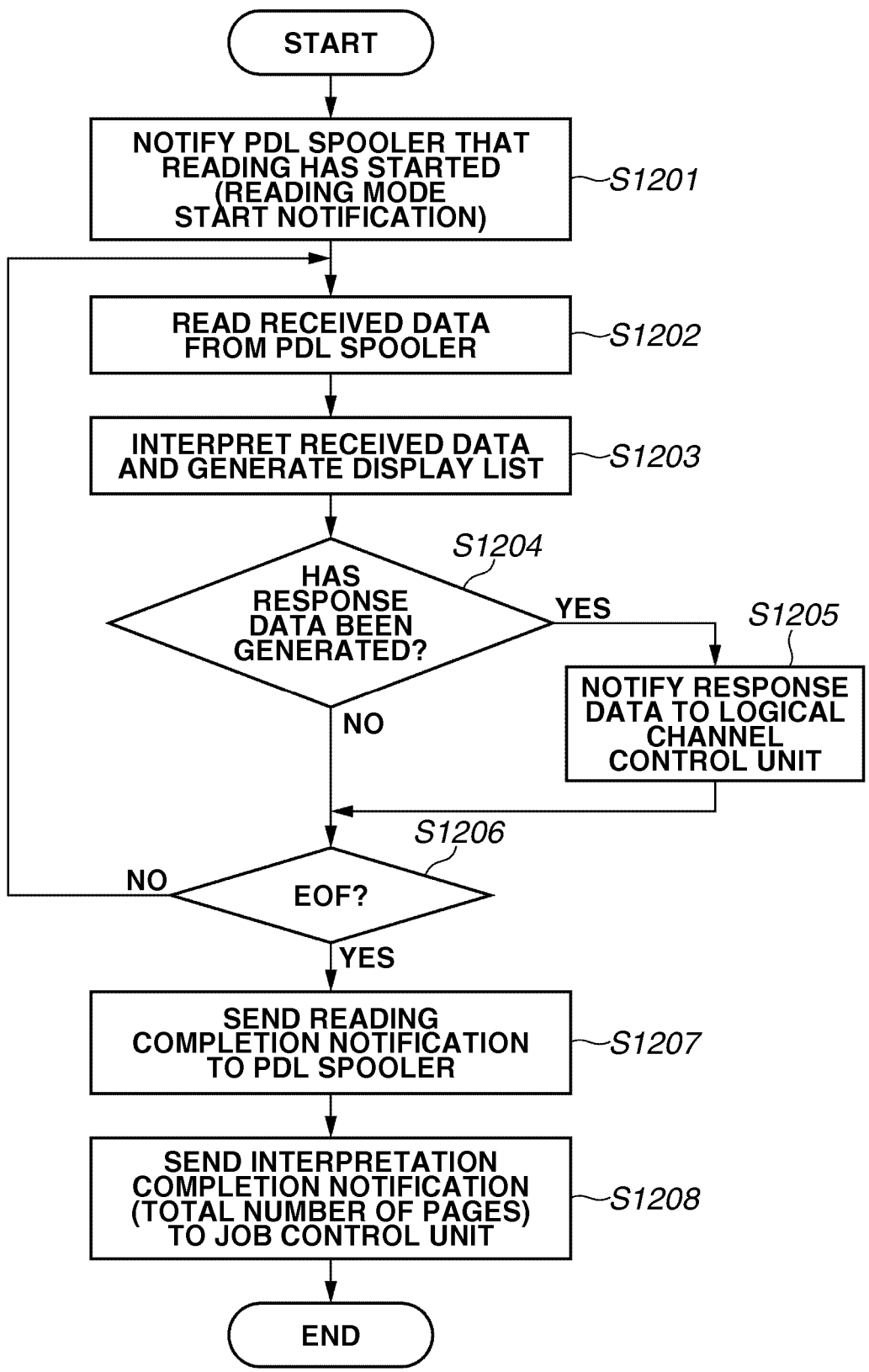
FIG. 12 is a flow chart illustrating an example of processing for starting a process performed by a PDL interpreter according to an exemplary embodiment of the present invention.

FIG. 12 is a flow chart illustrating an example of a processing program executed by the PDL interpreter 206 (e.g., 206a and 206b) when an instruction from the job control unit 211 for starting processing is issued.

Referring to the example illustrated in FIG. 12, in step S1201, when the instruction for starting the processing from the job control unit 211 is received, the PDL interpreter 206 (e.g., 206a or 206b) notifies the PDL spooler 203 that the reading of the received data 205 has started.

In the reading start notification, the "reading mode" designated by the job control unit 211 is designated.

In step S1202, the PDL interpreter 206 serially reads the received data 205 from the PDL spooler 203. In step S1203, the PDL interpreter 206 interprets the read received data 205, generates the display list 207, and stores the generated display list 207 on the RAM 108.

In step S1204, the PDL interpreter 206 determines whether the response data 208 to be sent to the host has been generated as a result of interpreting the received data 205. If it is determined that the response data 208 to be sent to the host has been generated (YES in step S1204), then the processing advances to step S1205. In step S1205, the PDL interpreter 206 stores the generated response data 208 that is to be sent to the host on the RAM 108 and notifies the logical channel control unit 201 that the response data 208 to be sent to the host has been stored. The PDL interpreter 206 repeats the processing in steps S1202 through S1205 until the end of the received data 205 (EOF) is detected.

In step S1206, the PDL interpreter 206 determines whether the end of the received data 205 (EOF) has been detected. If it is determined that the end of the received data 205 (EOF) has not been detected (NO in step S1206), then the processing returns to step S1202 and the processing is repeated. On the other hand, if it is determined that the end of the received data 205 (EOF) has been detected (YES in step S1206), then the processing advances to step S1207. In step S1207, the PDL interpreter 206 transmits a notification indicating that the reading of the received data 205 has been completed, to the PDL spooler 203.

In step S1208, the PDL interpreter 206 transmits a notification indicating that the interpretation of the received data 205 has been completed, to the job control unit 211.

A number of total pages of the job is included in the interpretation completion notification to the job control unit 211. When the notification from the PDL interpreter 206 is received, the job control unit 211 sets a value of the total pages in a field "number of total pages (TP)" of the job management table 212 of the job.

Figure 13:
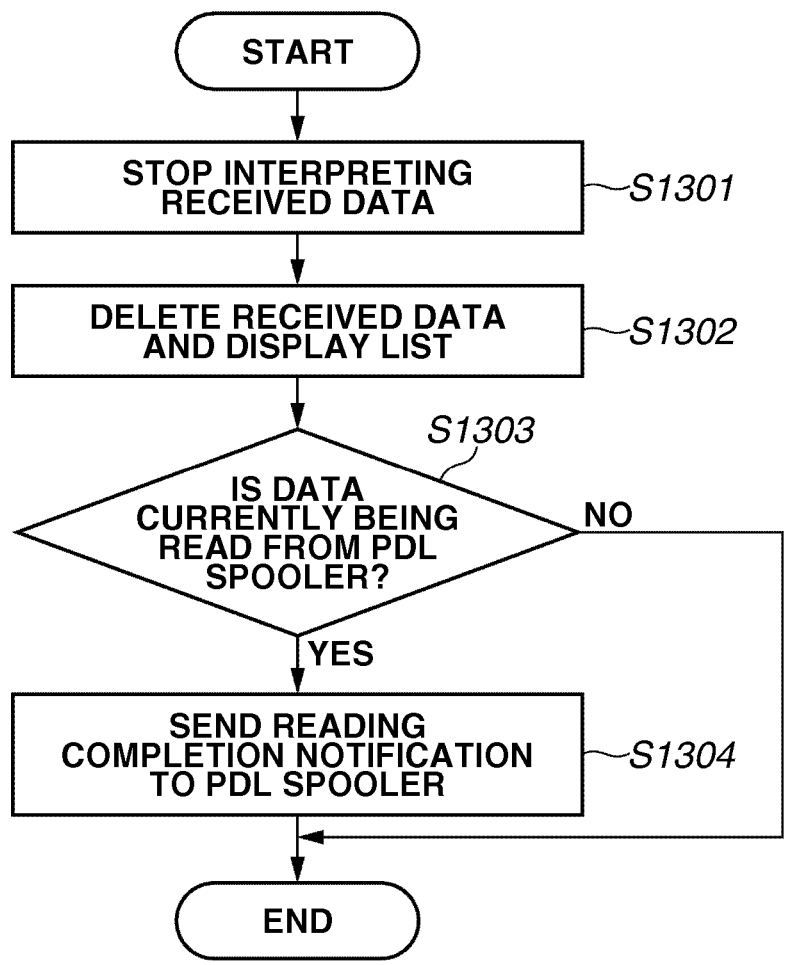
FIG. 13 is a flow chart illustrating an example of processing for suspending a process performed by a PDL interpreter according to an exemplary embodiment of the present invention.

FIG. 13 is a flow chart illustrating an example of a processing program executed by the PDL interpreter 206 (e.g., 206a and 206b) when the job control unit 211 has issued an instruction for suspending the processing.

Referring to the example illustrated in FIG. 13, in step S1301, when the instruction for suspending the processing is received, the PDL interpreter 206 (e.g., 206a or 206b) suspends the interpretation of the received data 205 that is currently being processed.

In step S1302, the PDL interpreter 206 deletes the received data read from the PDL spooler 203 and temporarily stored on the RAM 108, and the display list 207 that is being generated.

In step S1303, the PDL interpreter 206 determines whether the data is currently being read from the PDL spooler 203 (e.g., whether the data has been completely read from the PDL spooler 203). If it is determined that the data has not yet been completely read from the PDL spooler 203 (NO in step S1303), then the processing ends. On the other hand, if it is determined that the data has been completely read from the PDL spooler 203 (YES in step S1303), then the processing advances to step S1304.

In step S1304, the PDL interpreter 206 notifies the PDL spooler 203 that the data has been completely read from the PDL spooler 203. Then, the processing ends.

Figure 14:
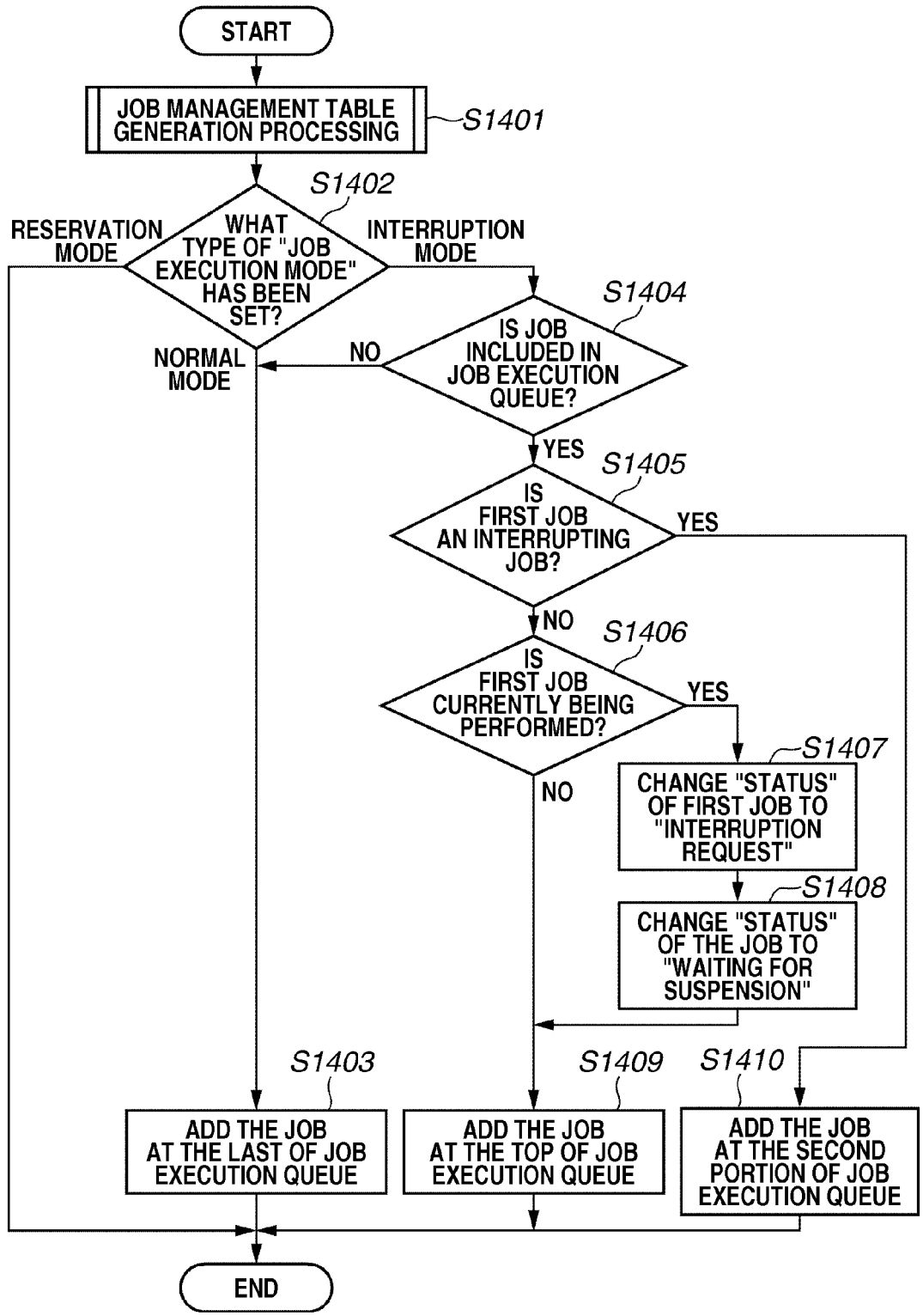
FIG. 14 is a flow chart illustrating an example of job receiving processing performed by a job control unit according to a first exemplary embodiment of the present invention.

FIG. 14 illustrates an example of a processing program executed when the job control unit 211 receives a job receiving notification from the job identification unit 202.

Referring to the example illustrated in FIG. 14, in step S1401, the job control unit 211 generates a job management table 212.

Now, an embodiment of the job management table 212 will be described in detail below with reference to FIG. 15. FIG. 15 illustrates an exemplary configuration of the job management table 212 according to a first exemplary embodiment of the present invention.

Referring to FIG. 15, the job management table 212 comprises the "JobID", the "job setting information", and the "job control information".

The "JobID" indicates the job identifier. The job ID notified from the job identification unit 202 is set to the "JobID".

The "job setting information" is the setting information about the job generated by the job identification unit 202 by interpreting the job packet received from the host 2. The job identification unit 202 notifies the job control unit 211 of the "job setting information" included in and together with the job receiving notification.

The "job setting information" includes a "job execution mode", a "PDL type", the "number of sets of copies", and "collate printing".

The "job execution mode" indicates timing for executing the job. A "normal mode" indicates that the jobs are serially performed in a received order. An "interruption mode" indicates that the job is executed by interrupting a currently performed job. A "reservation mode" indicates that the job is not executed (i.e., the job control unit 211 does not start executing the job) until the user issues a job execution instruction.

The "PDL type" indicates a type of the PDL data included in a job. PDL identifications, such as for example a laser beam printer (LBP) image processing system (LIPS) or PostScript, may be set to the "PDL type".

The number of sets of print copies in the job is set to the "number of sets of copies". In addition, the "collate printing" designates whether the job is printed by collate printing.

The "job control information" is set and used by the job control unit 211 to control the job.

The "job control information" includes a "status", the "reading mode", the "number of total pages (TP)", "number of generated pages (RP)", and "number of printed pages (OP)".

More specifically, the "status" indicates the status of execution of the job. Either one of status information including, for example, "waiting for execution", "job in execution", "interruption request", "waiting for suspension", and "job under suspension, may be set to the "status" according to the actual job execution status.

The "reading mode" is the same as the "reading mode" stored in the received data management table 204. The "number of total pages (TP)" indicates the number of total pages for one job.

The "number of generated pages (RP)" indicates the number of pages, a page image 210 of which has been generated by the image forming and output unit 209. The "number of printed pages (OP)" indicates the number of pages that have been completely printed by the printer engine 40. The processing and updating of each of the above-described parameters will be described in detail below.

Figure 16:
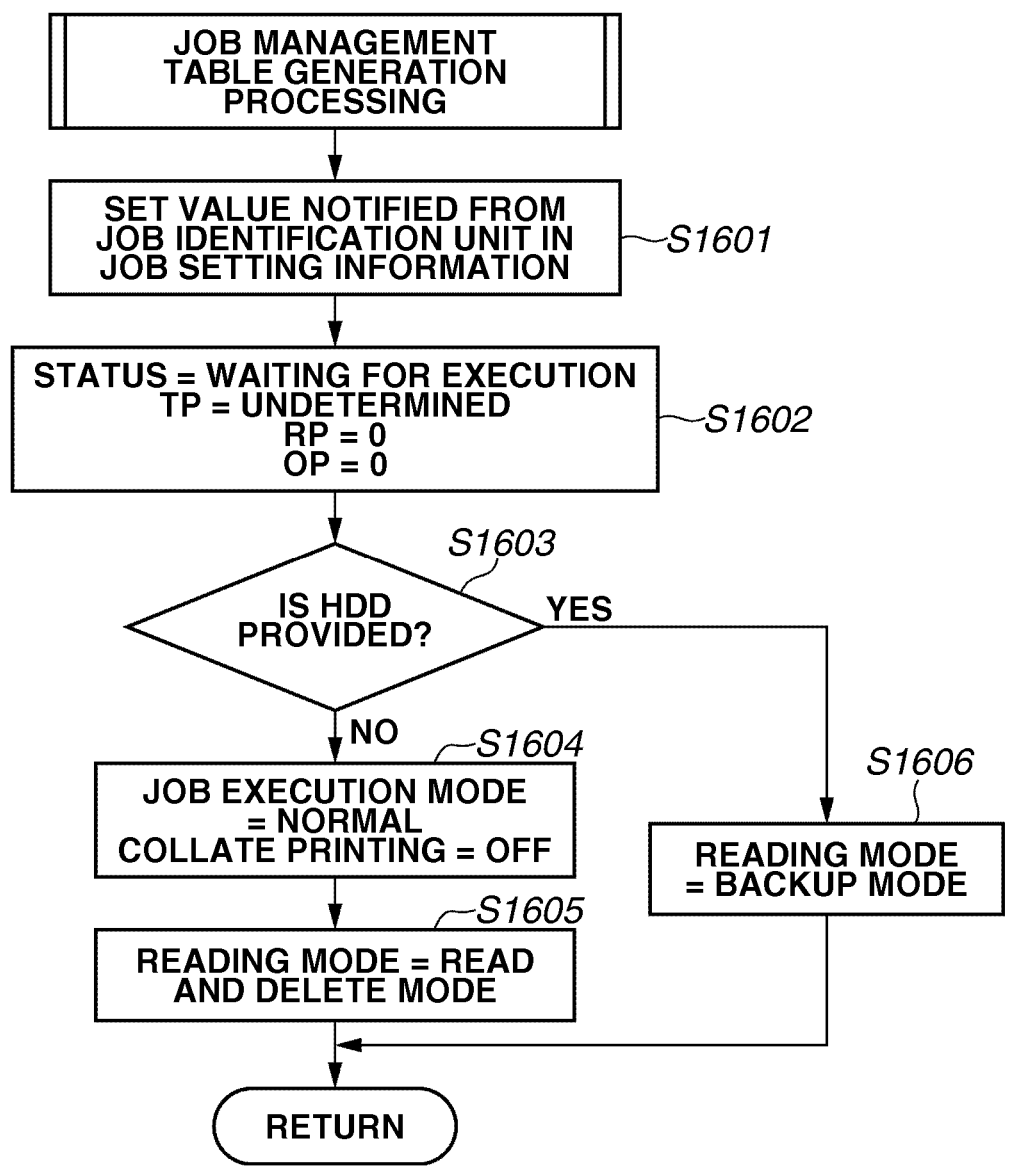
FIG. 16 is a flow chart illustrating an example of job management table generation processing performed by an image forming apparatus.

FIG. 16 is a flow chart illustrating an example of a processing program for generating the job management table 212 executed by an example of an image forming apparatus.

Referring to the example illustrated in FIG. 16, in step S1601, the job control unit 211 sets values notified from the job identification unit 202 to each of the above-described parameters included in the "job setting information".

In step S1602, the job control unit 211 sets the "waiting for execution" to the "status", "undetermined" to the "number of total pages (TP)" column, and a parameter value "0" to the "number of generated pages (RP)" and "number of printed pages (OP)".

In step S1603, the job control unit 211 determines whether the storage device (HDD) 30 is mounted on the image forming apparatus 1.

If it is determined that the storage device (HDD) 30 is mounted on the image forming apparatus 1 (YES in step S1603), then the processing advances to step S1606. In step S1606, the job control unit 211 sets the "backup mode" to the "reading mode".

On the other hand, if it is determined that no HDD 30 has been mounted on the image forming apparatus 1 (NO in step S1603), then the processing advances to step S1604. In step S1604, the job control unit 211 overwrites the "job execution mode" with "normal", and the "collate printing" with a parameter value "OFF". In step S1605, the job control unit 211 sets the "read and delete mode" to the "reading mode".

In a case where the storage device (HDD) 30 is not provided, the storage area for the received data 205 cannot be appropriately secured. Therefore, the above-described processing is performed to cope with such a case and restrict an operation for storing the received data 205 and functions (e.g., the interruption printing, the collate printing, and the reservation printing) which are implemented by storing the received data 205.

Figure 17:
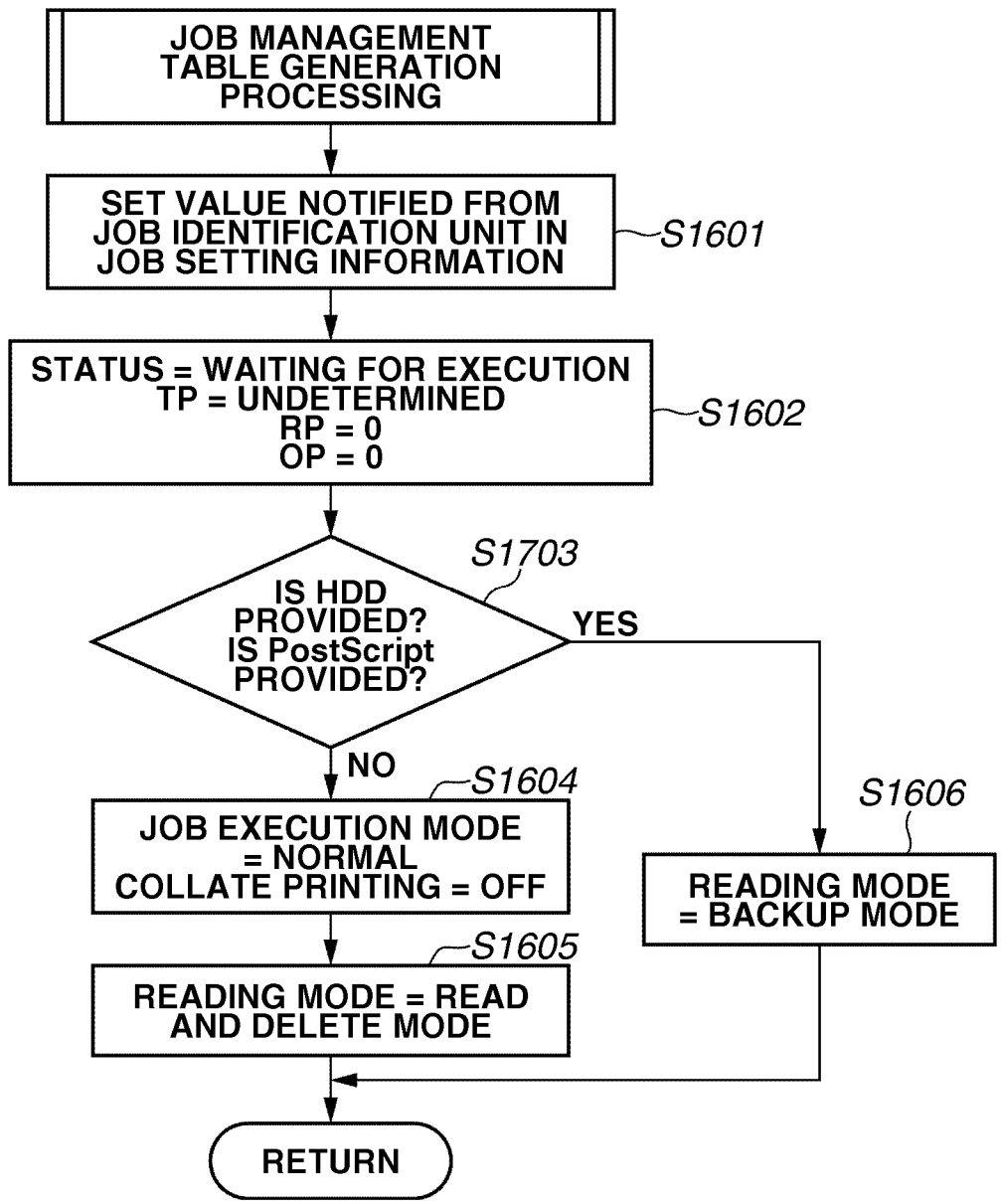
FIG. 17 is a flow chart illustrating an example of job management table generation processing according to the first exemplary embodiment of the present invention.

FIG. 17 is a flow chart illustrating an example of a program for generating the job management table 212 according to the present exemplary embodiment.

The example of processing for generating the job management table 212 according to the present exemplary embodiment, as illustrated in FIG. 17, is different from that performed by the above-described image forming apparatus, in that the job control unit 211 determines not only the type of the PDL interpreter 206 installed in the image forming apparatus 1, but also determines whether the storage device (HDD) 30 is mounted (e.g., in step S1703).

In the present exemplary embodiment, the job control unit 211 determines whether PostScript is installed to determine the type of the PDL interpreter, so as to restrict the operation for storing the received data 205 and executing the functions (e.g., the interruption printing, the collate printing, and the reservation printing) which are implemented by storing the received data 205, since specific types of PDL support a print mode for interactively communicating with the host.

Returning to the example illustrated in FIG. 14, the processing after step S1401, which is performed when the job control unit 211 receives the job, will be described in detail below.

When generation of the job management table 212 in step S1401 is completed, the processing advances to step S1402. In step S1402, the job control unit 211 determines whether to add the job to the job execution queue 213 according to the "job execution mode" of the job.

If it is determined that the "reservation mode" has been set to the "job execution mode" (RESERVATION MODE in step S1402), then the job control unit 211 does not add the job to the job execution queue 213 since the job is not executed until the user issues the instruction for starting the job.

If it is determined that the "normal mode" has been set to the "job execution mode" (NORMAL MODE in step S1402), then the processing advances to step S1403. In step S1403, the job control unit 211 adds the job to a last portion of the job execution queue 213.

On the other hand, if it is determined in step S1402 that the "interruption mode" has been set to the "job execution mode" (INTERRUPTION MODE in step S1402), then the processing advances to step S1404.

In step S1404, the job control unit 211 determines whether any job is included in the job execution queue 213. If it is determined that the job is not included in the job execution queue 213 (NO in step S1404), then the processing advances to step S1403. In step S1403, the job control unit 211 adds the job to the last portion, namely a top portion, of the job execution queue 213.

If it is determined in step S1404 that the job is included in the job execution queue 213 (YES in step S1404), then the processing advances to step S1405. In step S1405, the job control unit 211 refers to the "job execution mode" of a first job of the job execution queue 213 to determine whether the first job is an interrupting job.

If it is determined that the first job is an interrupting job (YES in step S1405), then the processing advances to step S1410. In step S1410, the job control unit 211 adds the job to the job execution queue 213 as a second job, so as to inhibit further interruption to the interrupting job.

If it is determined that the first job is not an interrupting job (NO in step S1405), then the processing advances to step S1406. In step S1406, the job control unit 211 refers to the "status" of the first job to determine whether the "job in execution" has been set to the "status" of the first job.

If it is determined that the "job in execution" has not been set to the "status" of the first job (NO in step S1406), then the processing advances to step S1409.

In step S1409, the job control unit 211 adds the job to the top portion of the job execution queue 213.

On the other hand, if it is determined that the "job in execution" has been set to the "status" of the first job (YES in step S1406), then the processing advances to step S1407. In step S1407, the job control unit 211 changes the "status" of the first job to "interruption request" because it may be necessary to suspend the first job that is currently performed.

Then in step S1408, the job control unit 211 changes the "status" of the job to the "waiting for suspension".

In step S1409, the job control unit 211 adds the job to the top portion of the job execution queue 213.

Figure 18:
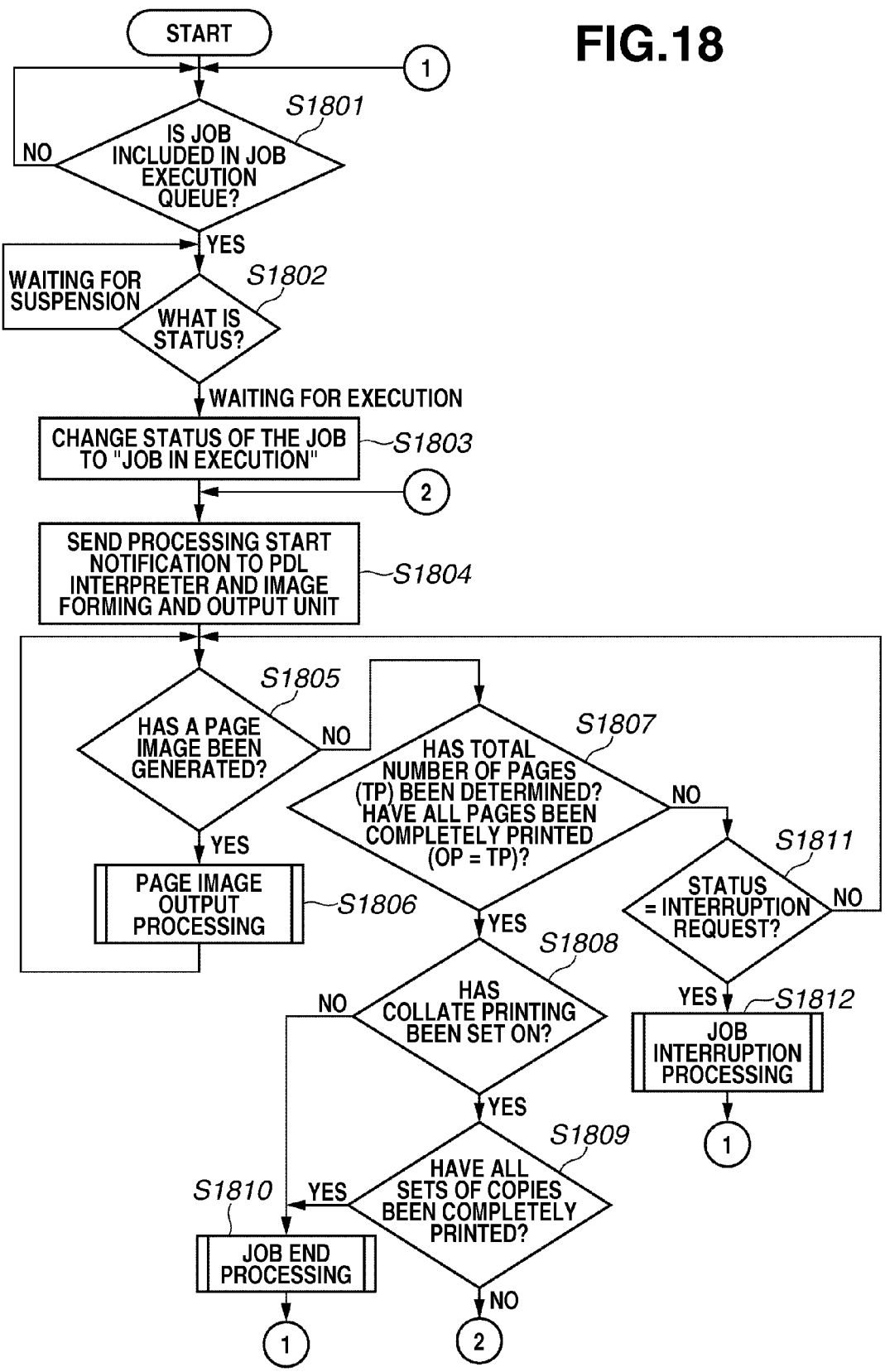
FIG. 18 is a first flow chart illustrating an example of job execution processing performed by a job control unit according to an exemplary embodiment of the present invention.

FIG. 18 is a flow chart illustrating an example of a processing program for executing the job with the job control unit 211.

Referring to FIG. 18, in step S1801, the job control unit 211 determines whether the job execution queue 213 includes a job.

If it is determined that the job execution queue 213 does not include a job (NO in step S1801), then the processing returns to step S1801, and waits until a job is input.

On the other hand, if it is determined that the job execution queue 213 includes a job (YES in step S1801), then the processing advances to step S1802. In step S1802, the job control unit 211 refers to the status of the job stored in the job management table 212.

If it is determined that the "waiting for suspension" is set to the "status" (WAITING FOR SUSPENSION in step S1802), then the job control unit 211 repeats the processing in step S1802 and waits until the "status" is changed to "waiting for execution".

If it is determined in step S1802 that the "waiting for execution" is set to the "status" (WAITING FOR EXECUTION in step S1802), then the processing advances to step S1803. In step S1803, the job control unit 211 changes the "status" of the job to "job in execution".

In step S1804, the job control unit 211 notifies the PDL interpreter 206 (e.g., 206a or 206b), which is identified by the "PDL type" stored in the job management table 212, and the image forming and output unit 209, that the processing has been started.

With respect to the PDL interpreter 206, the job control unit 211 designates the "reading mode" stored in the job management table 212 and notifies the start of the processing.

When the processing performed by the PDL interpreter 206 (e.g., 206a or 206b) and the image forming and output unit 209 is started, actual print processing is started.

When the print processing is started, in step S1805, the job control unit 211 inquires of the image forming and output unit 209 whether a generated page image 210 exists.

If it is determined that the generated page image 210 exists (YES in step S1805), then the processing advances to step S1806. In step S1806, the job control unit 211 causes the image forming and output unit 209 to output the page image 210.

Figure 19:
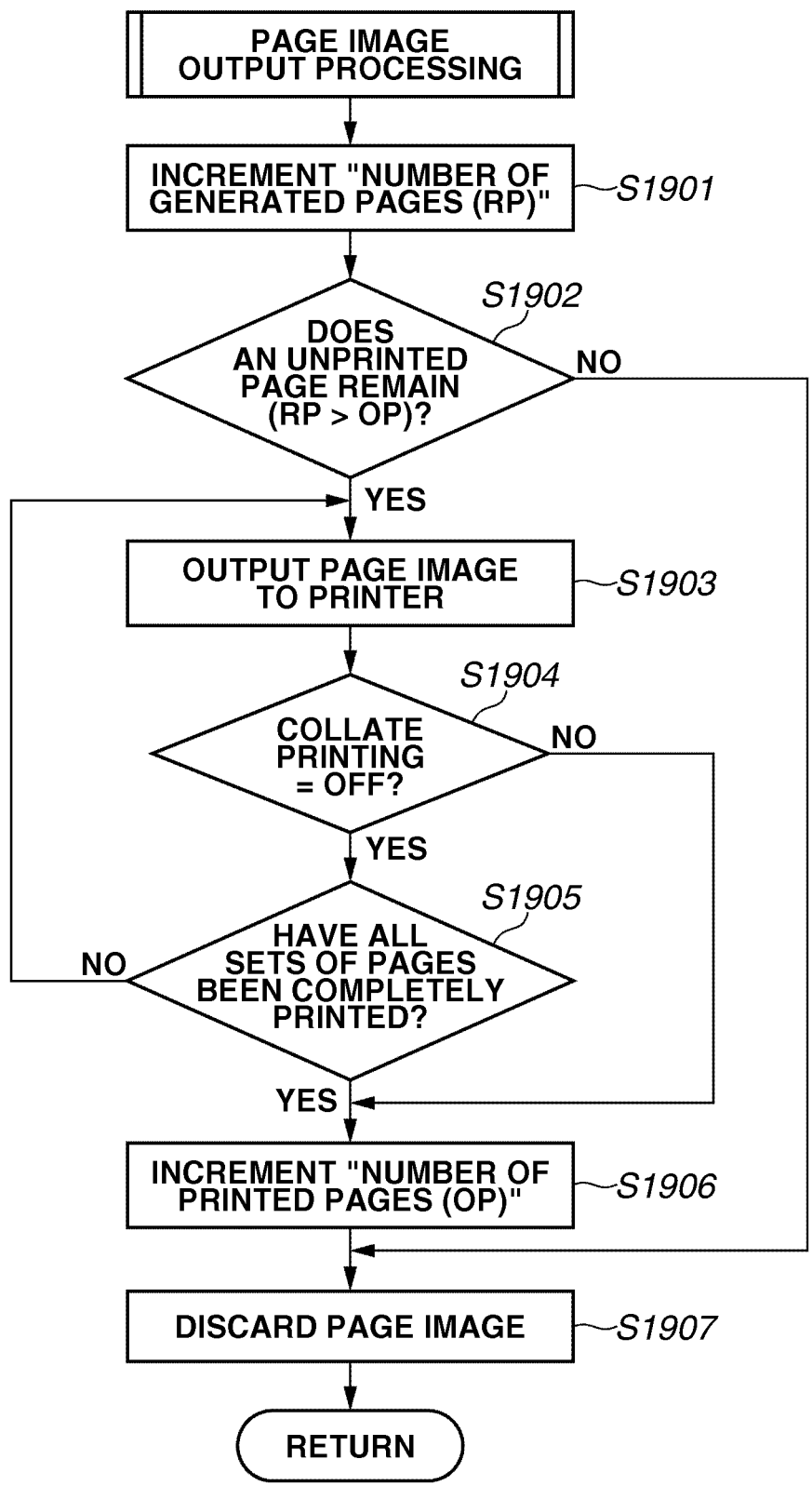
FIG. 19 is a second flow chart illustrating an example of the job execution processing performed by a job control unit according to an exemplary embodiment of the present invention.

FIG. 19 is a flow chart illustrating an example of a processing program for outputting the page image 210 in step S1806 of FIG. 18.

Referring to FIG. 19, in step S1901, the job control unit 211 increments the "number of generated pages (RP)" stored in the job management table 212. In step S1902, the job control unit 211 compares the "number of printed pages (OP)" with the incremented "number of generated pages (RP)" and determines whether the page is an unprinted page.

If it is determined that the page is an unprinted page (YES in step S1902), then the processing advances to step S1903. In step S1903, the job control unit 211 instructs the image forming and output unit 209 to output the page image 210. The image forming and output unit 209 prints the page image 210 with the printer engine 40.

On the other hand, if it is determined that the page has already been printed (NO in step S1902), then the processing advances to step S1907. In step S1907, the job control unit 211 instructs the image forming and output unit 209 to discard the page image 210 so that the page that has already been printed before the interrupting job is not printed again at the time of resuming an interrupted job (returning from the interrupting job). Then, the processing ends.

In step S1903, when one page is completely printed, the job control unit 211 refers to "collate printing" stored in the job management table 212. In step S1904, the job control unit 211 determines whether "collate printing" is set for the job.

If it is determined that "collate printing" is not set "OFF" (NO in step S1904), the processing advances to step S1906. On the other hand, if it is determined that "collate printing" is set "OFF" (YES in step S1904), then the processing advances to step S1905. In step S1905, the job control unit 211 prints a plurality of copies of the page image 210 with respect to each page. Therefore, the job control unit 211 causes the image forming and output unit 209 to print the page for a number of times designated by the "number of sets of copies".

When the printing of the page is not completed (NO in step S1905), then the processing returns to step S1903. On the other hand, when the printing of the page is completed (YES in step S1905), the processing advances to step S1906. In step S1906, the job control unit 211 increments the "number of printed pages (OP)" stored in the job management table 212. In step S1907, the job control unit 211 instructs the image forming and output unit 209 to discard the page image 210. Then, the processing ends.

Returning to FIG. 18, if it is determined in step S1805 that no generated page image 210 exists (NO in step S1805), then the processing advances to step S1807.

In step S1807, the job control unit 211 refers to the job management table 212 of the job to determine whether the "number of total pages (TP)" has been determined, and whether all the pages have been completely printed (whether OP is equivalent to TP).

If it is determined that all the pages have been completely printed (YES in step S1807), then the processing advances to step S1808. In step S1808, the job control unit 211 refers to "collate printing" stored in the job management table 212 to determine whether "collate printing" is set for the job.

If it is determined that the collate printing is set "ON" (YES in step S1808), then the processing advances to step S1809. In step S1809, in order to print a plurality of sets of copies with respect to each job, the job control unit 211 determines whether all the sets of copies have been completely printed.

If it is determined that any sets of copies remain to be printed (NO in step S1809), then the processing returns to step S1804 to print the subsequent sets of copies.

When a notification indicating the above-described state is received, the PDL interpreter 206 (e.g., 206a or 206b) reads and interprets the received data 205 of the job stored in the PDL spooler 203 again from its top portion. Thus, the printing of a plurality of sets of copies may be implemented.

If it is determined in step S1808 that "collate printing" is set "OFF" (NO in step S1808), and if it is determined in step S1809 that all the sets of copies have been completely printed (YES in step S1809), then the processing advances to step S1810. In step S1810, the job control unit 211 performs job end processing.

Figure 20:
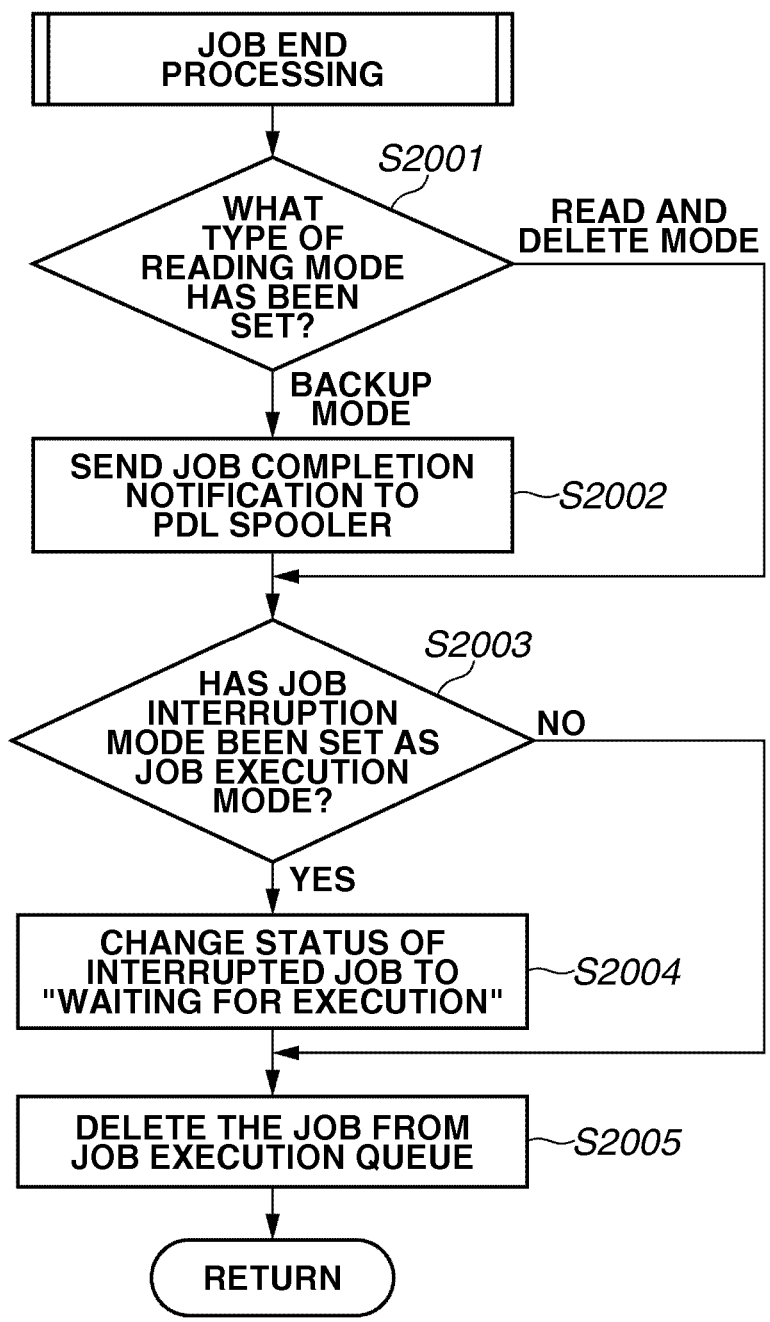
FIG. 20 is a third flow chart illustrating an example of the job execution processing performed by a job control unit according to an exemplary embodiment of the present invention.

FIG. 20 is a flow chart illustrating an example of a job end processing program executed in step S1810 of FIG. 18.

Referring to the example illustrated in FIG. 20, in step S2001, the job control unit 211 refers to the "reading mode" stored in the job management table 212 to determine what type of the "reading mode" has been set. If it is determined that the "backup mode" has been set to the "reading mode" (BACKUP MODE in step S2001), then the processing advances to step S2002. If it is determined that the "read and delete mode" is set as the "reading mode" (READ AND DELETE MODE in step S2001), then the processing advances to step S2003.

In step S2002, the job control unit 211 transmits a job completion notification to the PDL spooler 203.

When the notification is received, the PDL spooler 203 advances to step S1101 of FIG. 11. In step S1101, the PDL spooler 203 deletes the received data 205 and the received data management table 204 of the job.

In step S2003, the job control unit 211 refers to the "job execution mode" stored in the job management table 212 to determine whether the job is an interrupting job.

If it is determined that the job is the interrupting job (YES in step S2003), then the processing advances to step S2004. In step 2004, the job control unit 211 changes the "status" of the interrupted job (e.g., a job whose "status" is "job under suspension") to the "waiting for execution". On the other hand, if it is determined that the job is not the interrupting job (NO in step S2003), the processing advances to step S2005.

Then, in step S2005, the job control unit 211 deletes the job from the job execution queue 213 and ends the series of processing.

Returning to FIG. 18, in step S1807, if it is determined that all the pages have not been completely printed (NO in step S1807), then the processing advances to step S1811. In step S1811, the job control unit 211 refers to the "status" stored in the job management table 212 to determine whether the "status" has been changed to the "interruption request".

If it is determined that the "status" has been changed to the "interruption request" (YES in step S1811), then the processing advances to step S1812 because the "status" indicates that the interrupting job has been input. In step S1812, the job control unit 211 performs the job interruption processing.

On the other hand, if it is determined that the "status" has not been changed to the "interruption request (NO in step S1811), then the processing returns to step S1805 to continue printing subsequent pages.

Figure 21:
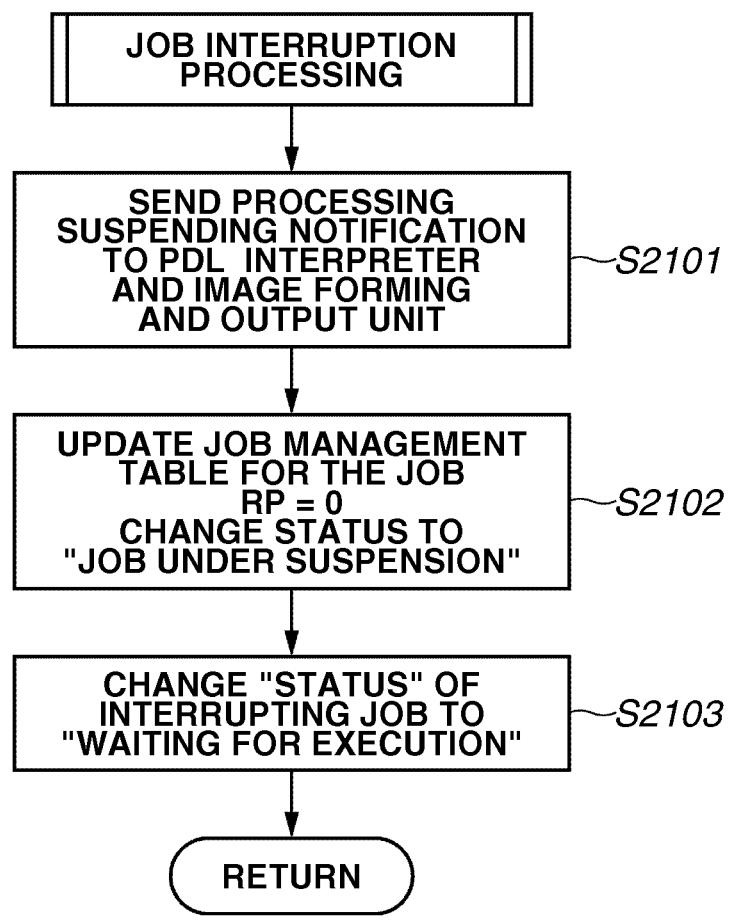
FIG. 21 is a fourth flow chart illustrating an example of the job execution processing performed by a job control unit according to an exemplary embodiment of the present invention.

FIG. 21 is a flow chart illustrating an example of a job interruption processing program that may be executed in step S1812.

Referring to FIG. 21, in step S2101, the job control unit 211 notifies the PDL interpreter 206 (e.g., 206a or 206b), and the image forming and output unit 209 that have performed the processing of the job, that the processing is to be suspended.

When the notification is received, each of the PDL interpreter 206 and the image forming and output unit 209 deletes the data (e.g., the display list 207 and the page image 210) which is currently being processed.

In step S2102, the job control unit 211 clears the parameter value of the "number of generated pages (RP)" and changes the "status" to the "job under suspension" in the job management table 212 of the job.

In step S2103, the job control unit 211 changes the "status" of the interrupting job (the job whose "status" is "waiting for suspension") to "waiting for execution". Then, the processing ends.

Figure 22:
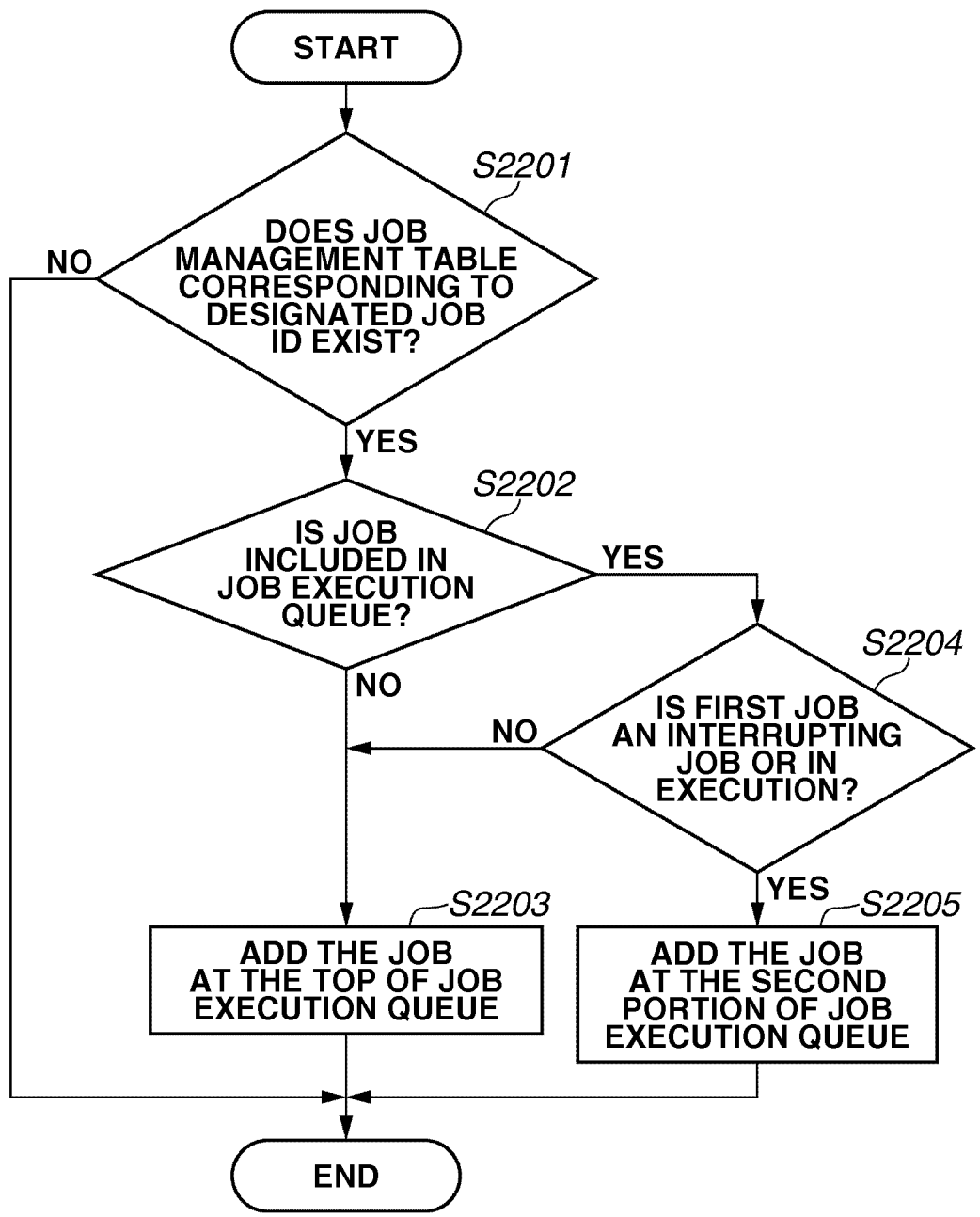
FIG. 22 is a flow chart illustrating an example of reservation printing execution processing performed by a job control unit according to an exemplary embodiment of the present invention.

FIG. 22 is a flow chart illustrating an example of a processing program executed when the job control unit 211 is instructed to start the reservation printing.

The instruction is input by the user by designating the job (e.g., the JobID) reserved in the image forming apparatus 1 via the panel 20 or the host 2. The instruction input by the user is then input to the job control unit 211 via the device management unit 214.

Referring to FIG. 22, in step S2201, the job control unit 211 determines whether the job management table 212 corresponding to the designated job ID exists. If it is determined that the job management table 212 corresponding to the designated job ID does not exist (NO in step S2201), then the processing ends without executing anything.

On the other hand, if it is determined that the job management table 212 corresponding to the designated job ID exists (YES in step S2201), then the processing advances to step S2202. In step S2202, the job control unit 211 determines whether a job is included in the job execution queue 213.

If it is determined that a job is not included in the job execution queue 213 (NO in step S2202), then the processing advances to step S2203. In step S2203, the job control unit 211 adds the job to the top portion of the job execution queue 213.

On the other hand, if it is determined that a job is included in the job execution queue 213 (YES in step S2202), then the processing advances to step S2204.

In step S2204, the job control unit 211 refers to the job management table 212 for the first job and determines whether the first job is the interrupting job or whether the "status" is "job in execution". If it is determined that the first job is the interrupting job or the "status" is "job in execution" (YES in step S2204), then the processing advances to step S2205. In step S2205, the job control unit 211 adds the job to the second portion of the job execution queue 213.

On the other hand, if it is determined that the first job is not an interrupting job, or the "status" is not "job in execution" (NO in step S2204), then the processing advances to step S2203. In step S2203, the job control unit 211 adds the job to the top portion of the job execution queue 213. Then, the processing ends.

As described above, the present exemplary embodiment restricts executing specific print functions (function for storing the PDL data received from the host 2 in the PDL spooler 203, the interruption printing function, the collate printing function, and the reservation printing function) according to the type of the PDL interpreter which is installed in the image forming apparatus 1.

Accordingly, the present exemplary embodiment may be capable of relatively securely executing the interactive print mode by restricting execution of the above-described specific print function in the case where the image forming apparatus 1 is provided with the PDL interpreter that supports the print mode for interactively communicating with the host, such as PostScript.

In the first exemplary embodiment, the execution of the specific print function is restricted according to the type of the PDL interpreter installed in the image forming apparatus 1. However, a second exemplary embodiment restricts the execution of the specific print function with respect to each received job.

For example, in a case where PostScript data is received in AppleTalk printer access protocol (PAP) direct mode, the image forming apparatus 1 may support the print mode for interactively communicating with the host.

In this case, the image forming apparatus 1 can identify whether the received job is a PAP Direct job according to a socket of the network via which the data has been transmitted. Thus, the present exemplary embodiment can restrict the execution of the specific print function with respect to each job based on a result of the identification of the type of the job.

FIG. 23 illustrates an exemplary configuration of the job management table 212 according to the second exemplary embodiment of the present invention.

The job management table 212 according to the second exemplary embodiment is different from that in the first exemplary embodiment (e.g., FIG. 15) in that information "PAP Direct" which indicates whether the job is a PAP Direct job is added to the job setting information.

The "PAP Direct" information is set to the job management table 212 in the following manner.

At first, the network I/F 104 notifies socket information about the network via which the data has been transmitted, to the logical channel control unit 201.

If the job has been received in the PAP Direct mode, the received mode is clearly indicated by the logical channel control unit 201 when the job packet is transmitted to the job identification unit 202.

Further, the job identification unit 202 adds the "PAP Direct" information to the job setting information and transmits the job receiving notification to the job control unit 211 including the job setting information. Then, the job setting information is set in the job management table 212.

Figure 24:
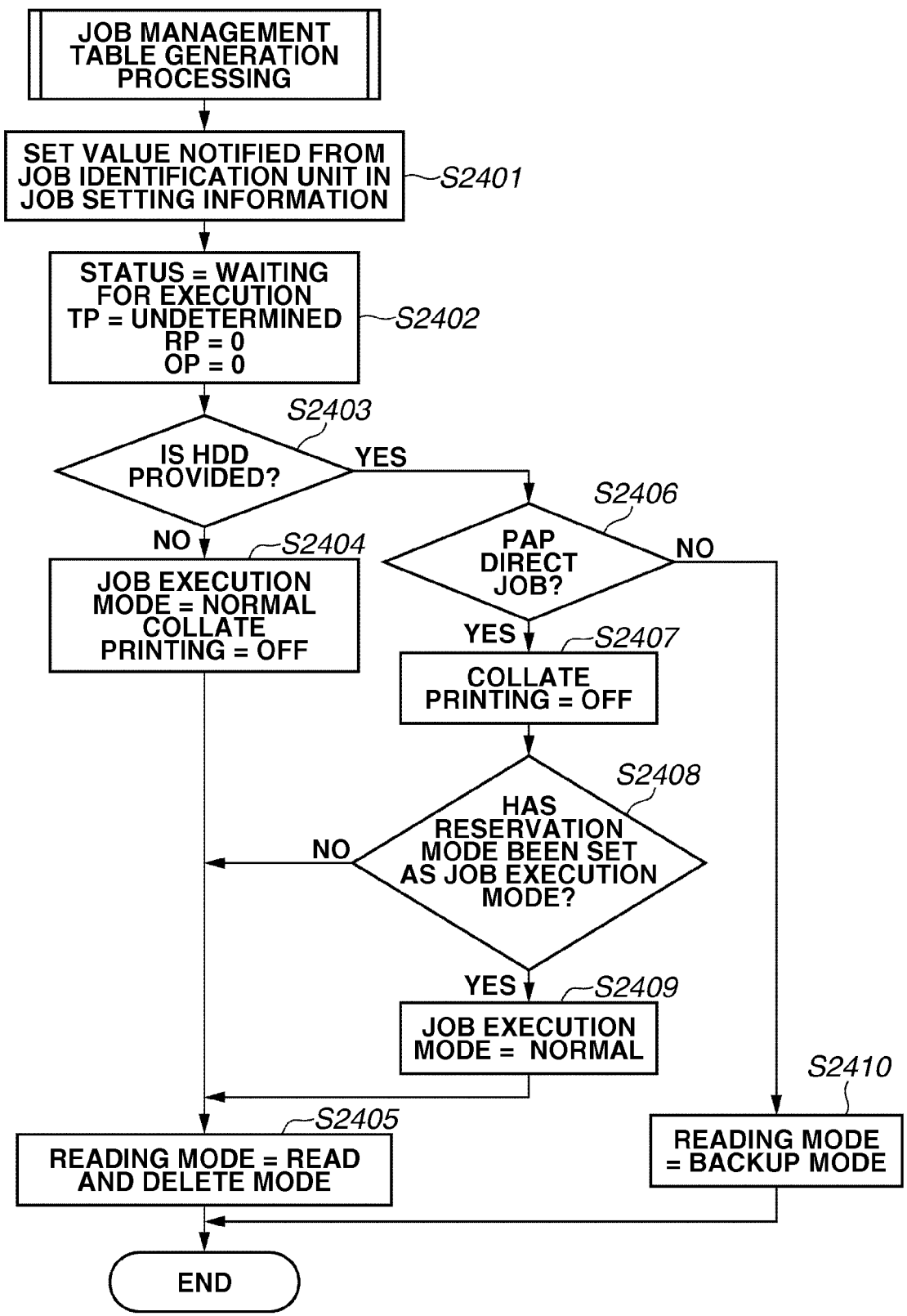
FIG. 24 is a flow chart illustrating an example of job management table generation processing according to the second exemplary embodiment of the present invention.

FIG. 24 is a flow chart illustrating an example of the program for generating the job management table 212 performed by the job control unit 211 according to the second exemplary embodiment.

The processing in steps S2401 and S2402 are the same as the processing in steps S1601 and S1602 in the first exemplary embodiment. Accordingly, the description thereof will not be repeated here.

In step S2403, the job control unit 211 determines whether the storage device (HDD) 30 has been mounted on the image forming apparatus 1.

If it is determined that the storage device (HDD) 30 has been mounted on the image forming apparatus 1 (YES in step S2403), then the processing advances to step S2406. In step S2406, the job control unit 211 refers to the "PAP Direct" stored in the job management table 212 to determine whether the job is the PAP Direct job.

If it is determined that the job is not the "PAP Direct" job (NO in step S2406), then the processing advances to step S2410. It may not be necessary in this case to particularly restrict the execution of the specific printing function. In step S2410, the job control unit 211 sets the "backup mode" to the "reading mode". Then, the processing ends.

On the other hand, if it is determined that the job is the "PAP Direct" job (YES in step S2406), then the processing advances to step S2407. In step S2407, the job control unit 211 overwrites the parameter of "collate printing" stored in the job management table 212 with "OFF".

In step S2408, the job control unit 211 determines whether the "reservation mode" has been set to the job execution mode. If it is determined that the "reservation" has been set to the job execution mode (YES in step S2408), then the processing advances to step S2409. In step S2409, the job control unit 211 overwrites the "job execution mode" with the "normal mode". On the other hand, if it is determined that the "reservation mode" has not been set to the job execution mode (NO in step S2408), then the processing advances to step S2405.

The processing can be securely and normally executed if the "PAP Direct" job is set to the interrupting job because further interruption to the interrupting job has previously been inhibited. Accordingly, in this case, the job control unit 211 does not overwrite the "job execution mode" (e.g., "interruption mode") with "normal".

If it is determined in step S2403 that no storage device (HDD) 30 is mounted on the image forming apparatus 1 (NO in step S2403), then the processing advances to step S2404. In step S2404, the job control unit 211 overwrites the "job execution mode" with "normal," and "collate printing" with "OFF". In step S2405, the job control unit 211 sets the "read and delete mode" to the "reading mode". Then, the processing ends.

As described above, in the case of the "PAP Direct" job, if the collate printing or the reservation printing has been designated by the user, the present exemplary embodiment may restrict the execution of the functions. Accordingly, the present exemplary embodiment can securely and normally execute the printing by interactively communicating with the host.

Figure 25:
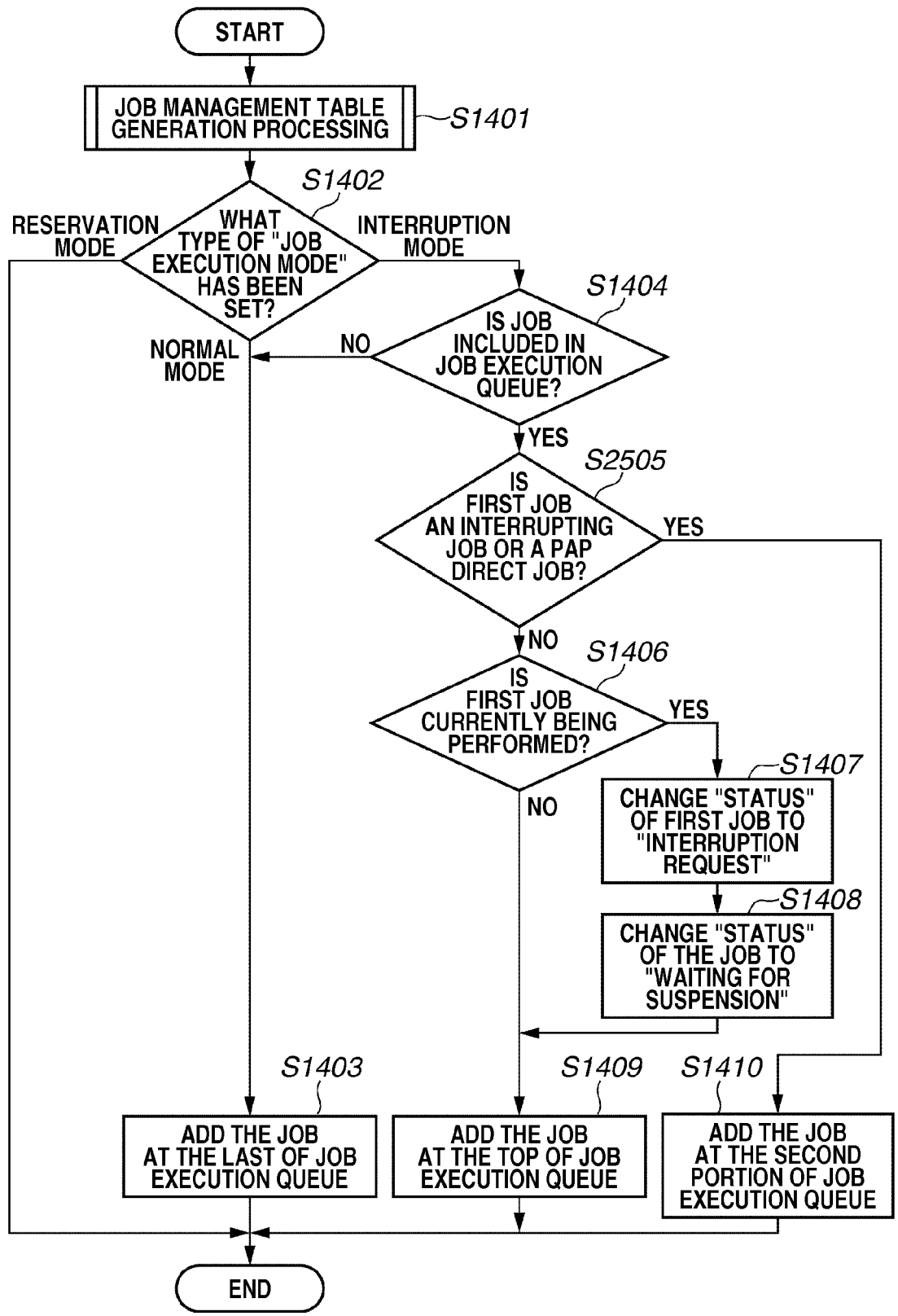
FIG. 25 is a flow chart illustrating an example of job receiving processing performed by a job control unit according to the second exemplary embodiment of the present invention.

FIG. 25 is a flow chart illustrating an example of a processing program executed when the job control unit 211 receives a job according to the second exemplary embodiment.

The second exemplary embodiment may be different from the first exemplary embodiment at least in the following point. In the first exemplary embodiment, in a case where the job received in step S2505 is an interrupting job and the job execution queue 213 includes the job, and when the first job is an interrupting job, further interruption to the interrupting job is inhibited. In addition to this, in the second exemplary embodiment, further interruption to the interrupting job is inhibited in a case where the first job is the PAP Direct job.

Accordingly, the interruption to the PAP Direct job is inhibited. Thus, the present exemplary embodiment can relatively securely and normally execute the printing by interactively communicating with the host in the case of the PAP Direct job.

As described above, when the received job supports the print mode for interactively communicating with the host, the present exemplary embodiment restricts the execution of the specific print function, such as interruption printing, collate printing, and reservation printing.

Therefore, in the case of a job that supports the print mode for interactively communicating with the host, such as the job input in the AppleTalk PAP Direct mode, the present exemplary embodiment can relatively securely and normally execute the print mode for interactively communicating with the host by restricting the execution of the above-described specific functions.

In the first and second exemplary embodiments, "collate printing" is not performed in a case where the image forming apparatus is equipped with the PostScript and a job is the PAP Direct mode job. However, the following method can be applied to execute the collate printing.

If the image forming apparatus 1 supports a method for storing the received data 205 and a method for storing the display list 207 and the page image 210, the latter method can be selected and used to execute the collate printing.

By performing the latter method, the received data 205 is not read again in the case of the collate printing. Accordingly, the print mode for interactively communicating with the host can be securely and normally executed.

As described above, with the above-described configuration, the exemplary embodiments of the present invention can securely and normally execute the specific print functions if the PDL interpreter that executes the processing by interactively communicating with the host is installed.

Further, with the above-described configuration, the exemplary embodiments of the present invention can securely and normally execute the specific print functions when print data to be printed by interactively communicating with the host is received.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-014461 filed Jan. 25, 2008, which is hereby incorporated by reference herein in its entirety.

What is claimed is:

1. A printing apparatus comprising:
   a receiving unit configured to receive a print job transmitted from a host;
   a determination unit configured to determine whether or not the print job received by the receiving unit is for a first job;
   an execution unit configured to restrict reservation printing for data of the print job in a case where the determination unit determines the print job to be processed is the first job, and to execute the reservation printing for the data of the print job in a case where the print job to be processed is not the first job, the reservation printing for data of the print job being performed by receiving an instruction from a user;
   wherein the execution unit performs normal printing for the data of the job in a case where the determination unit determines the job to be processed is the first job even under the instruction from the user for the reservation printing, and executes the reservation printing for the data of the job in a case where the job to be processed is not the first job.

2. The printing apparatus according to claim 1, wherein the first job includes a job of post script data.

3. The printing apparatus according to claim 1, wherein the first job includes a job to transmit response data upon executing the first job.

4. A printing method comprising:
   receiving a print job transmitted from a host;
   determining whether or not the received print job is for a first job;

restricting reservation printing for data of the print job in a case it is determined that the print job to be processed is the first job, and executing the reservation printing for the data of the print job in a case where the print job to be processed is not the first print job, the reservation printing for data of the print job being performed by receiving an instruction from a user;

wherein normal printing for the data of the job is executed in a case where it is determined that the job to be processed is the first job even under the instruction from the user for the reservation printing, and reservation printing for the data of the job is executed in a case where the job to be processed is not the first job.

5. The printing method according to claim 4, wherein the first job includes a job of post script data.

6. The printing method according to claim 4, wherein the first job includes a job to transmit response data upon executing the first job.

7. A non-transitory computer-readable storage medium containing computer-executable instructions for performing a printing method comprising:

receiving a print job transmitted from a host;

determining whether or not the received print job is for a first job;

restricting reservation printing for data of the print job in a case it is determined that the print job to be processed is the first job, and executing the reservation printing for the data of the print job in a case where the print job to be processed is not the first print job, the reservation printing for data of the print job being performed by receiving an instruction from a user;

wherein normal printing for the data of the job is executed in a case where it is determined that the job to be processed is the first job even under the instruction from the user for the reservation printing, and reservation printing for the data of the job is executed in a case where the job to be processed is not the first job.

8. The non-transitory computer-readable storage medium according to claim 7, wherein the first job includes a job of post script data.

9. The non-transitory computer-readable storage medium according to claim 7, wherein the first job includes a job to transmit response data upon executing the first job.

10. A printing apparatus comprising:

a unit configured to receive data from a host;

a unit configured to determine whether or not the received data includes a request for sending a response to the host;

a unit configured to determine whether or not the received data is indicated so as to be stored until a print instruction for the received data is issued by a user, and a storage unit configured to store the received data;

wherein the printing apparatus stores the received data in the storage unit without printing the received data until a print instruction for the received data is issued by a user in a case where the received data is determined not to include the request and is determined to be indicated so as to be stored until a print instruction for the received data is issued by a user, and wherein the printing apparatus prints the received job without a print instruction by a user in a case where the received data is determined to include the request and is determined to be indicated so as to be stored until a print instruction for the received data is issued by a user.

11. A printing method comprising:

receiving data from a host;

determining whether or not the received data includes a request for sending a response to the host;

determining whether or not the received data is indicated so as to be stored until a print instruction for the received data is issued by a user, and storing the received data in a storage unit;

wherein the received data is stored in the storage unit without printing the received data until a print instruction for the received data is issued by a user in a case where the received data is determined not to include the request and is determined to be indicated so as to be stored until a print instruction for the received data is issued by a user, and wherein the received job is printed without a print instruction by a user in a case where the received data is determined to include the request and is determined to be indicated so as to be stored until a print instruction for the received data is issued by a user.

12. a non-transitory computer-readable storage medium containing computer-executable instructions for performing a printing method comprising:

receiving data from a host;

determining whether or not the received data includes a request for sending a response to the host;

determining whether or not the received data is indicated so as to be stored until a print instruction for the received data is issued by a user, and storing the received data in a storage unit;

wherein the received data is stored in the storage unit without printing the received data until a print instruction for the received data is issued by a user in a case where the received data is determined not to include the request and is determined to be indicated so as to be stored until a print instruction for the received data is issued by a user, and wherein the received job is printed without a print instruction by a user in a case where the received data is determined to include the request and is determined to be indicated so as to be stored until a print instruction for the received data is issued by a user.

* * * * *